(12) United States Patent
Kimhi et al.

(10) Patent No.: US 11,204,963 B2
(45) Date of Patent: Dec. 21, 2021

(54) DIGITAL PROCESSING SYSTEMS AND METHODS FOR CONTEXTUAL AUTO-POPULATION OF COMMUNICATIONS RECIPIENTS IN COLLABORATIVE WORK SYSTEMS

(71) Applicant: MONDAY.COM LTD., Tel Aviv (IL)

(72) Inventors: Ron Kimhi, Herzliya (IL); Tomer Friedman, Tel Aviv (IL); Nadav Grinberg, Tel Aviv (IL); Adi Kalderon, Tel Aviv (IL)

(73) Assignee: Monday.com Ltd., Tel Aviv (IL)

( * ) Notice: Subject to any disclaimer, the term of this patent is extended or adjusted under 35 U.S.C. 154(b) by 0 days.

(21) Appl. No.: 17/243,768

(22) Filed: Apr. 29, 2021

(65) Prior Publication Data

US 2021/0357459 A1     Nov. 18, 2021

Related U.S. Application Data

(63) Continuation of application No. PCT/IB2021/000297, filed on Apr. 28, 2021, and a continuation-in-part of application No. PCT/IP2021/000090, filed on Feb. 21, 2021, and a continuation-in-part of application No.
(Continued)

(51) Int. Cl.
| | |
|---|---|
| *G06F 16/00* | (2019.01) |
| *G06F 16/9032* | (2019.01) |
| *G06F 16/901* | (2019.01) |
| *G06F 40/30* | (2020.01) |
| *G06F 16/9038* | (2019.01) |
| *G06F 16/951* | (2019.01) |

(Continued)

(52) U.S. Cl.
CPC ...... *G06F 16/90328* (2019.01); *G06F 16/909* (2019.01); *G06F 16/9017* (2019.01); *G06F 16/9038* (2019.01); *G06F 16/951* (2019.01); *G06F 16/9536* (2019.01); *G06F 40/30* (2020.01)

(58) Field of Classification Search
CPC .................................................. G06F 16/9536
See application file for complete search history.

(56) References Cited

U.S. PATENT DOCUMENTS

| | | | |
|---|---|---|---|
| 2017/0111327 A1* | 4/2017 | Wu | H04L 63/107 |
| 2017/0272316 A1* | 9/2017 | Johnson | G06Q 10/103 |

* cited by examiner

*Primary Examiner* — Ajith Jacob
(74) *Attorney, Agent, or Firm* — Finnegan, Henderson, Farabow, Garrett & Dunner, LLP

(57) ABSTRACT

Systems, methods, and computer readable media for auto-populating recipient fields based on context of source content are disclosed. The system may include a processor configured to: maintain a plurality of boards related to a common entity, the boards including external addresses; receive an indication of an intent to send a communication, the indication originating from a specific board of the plurality of boards; render a communication interface associated with the specific board; perform a look up of a subset of the plurality of boards linked to the specific board; retrieve external addresses from each of the subset of the plurality of boards; populate the communication interface with the communication and the retrieved external addresses; receive a selection of at least one of the retrieved external addresses; cause the communication to be transmitted; and link a copy of the transmitted communication to at least the specific board.

20 Claims, 20 Drawing Sheets

Related U.S. Application Data

PCT/IP2021/000024, filed on Jan. 14, 2021, and a continuation-in-part of application No. PCT/IP2020/000974, filed on Nov. 17, 2020, and a continuation-in-part of application No. PCT/IP2020/000658, filed on Aug. 7, 2020.

(60) Provisional application No. 63/148,092, filed on Feb. 10, 2021, provisional application No. 63/122,439, filed on Dec. 7, 2020, provisional application No. 63/121,803, filed on Dec. 4, 2020, provisional application No. 63/078,301, filed on Sep. 14, 2020, provisional application No. 63/019,396, filed on May 3, 2020, provisional application No. 63/018,593, filed on May 1, 2020.

(51) Int. Cl.
*G06F 16/909* (2019.01)
*G06F 16/9536* (2019.01)

| File | | File Icon | Author | | Author Icon | |
|---|---|---|---|---|---|---|
| 402a | Inspiration 18 items | 404a [Ins...] | 406a | Eva Davis | [icon] | 408a |
| 402b | Dance in New York.mov | 404b [▶] | 406b | Amy Smith | [icon] | 408b |
| 402c | New York campaign.xlsx | 404c [X] | | Eva Davis | [icon] | |
| 402d | Poster 1.pdf | 404d [img] | 406c | Jerome Clay | [icon] | 408c |
| 402e | Poster 2.pdf | 404e [img] | | Jerome Clay | [icon] | |
| 402f | Posters.docx | 404f [W] | | Eva Davis | [icon] | |
| 402g | Eye Painting.png | 404g [img] | | Amy Smith | [icon] | |
| 402h | EyePS.psd | 404h [Ps] | 406d | Warren Sawyer | [icon] | 408d |
| 402i | Facebook Album | 404i [img] | | Eva Davis | [icon] | |
| 402j | End of Year Party.pptx | 404j [P] | | Warren Sawyer | [icon] | |

FIG. 4

| File | Status | Date created | Author | Comments | File size |
|---|---|---|---|---|---|
| Inspiration 18 items | No status | 07/12/2020 | | 12 | 68.1MB |
| Dance in New York.mov | Approved | 01/21/2021 | | 62 | 154MB |
| New York campaign.xlsx | Needs Review | 01/11/2021 | | 21 | 3.4MB |
| Poster 1.pdf | Approved | 08/30/2020 | | 12 | 12.8MB |
| Poster 2.pdf | In Progress | 10/18/2020 | | 8 | 11.9MB |
| Posters.docx | In Progress | 10/18/2020 | | 3 | 25.6MB |
| Eye Painting.png | Approved | 09/20/2020 | | 0 | 14.0MB |
| EyePS.psd | Needs Review | 11/12/2020 | | 5 | 235MB |
| Facebook Album | No status | 12/26/2020 | | 15 | 0MB |
| End of Year Party.pptx | In Progress | 01/04/2021 | | 78 | 89.1MB |

| | Name | Email Address | |
|---|---|---|---|
| 1402a | Ralph | ralph@email.com | 1404a |
| 1402b | John | john@email.com | 1404b |
| 1402c | Sam | sam@email.com | 1404c |
| 1402d | Jordan | jordan@email.com | 1404d |

1402 — (Name column) ; 1404 — (Email Address column)

1425

| | Task | Assigned to: | |
|---|---|---|---|
| 1426a | Task #1 | Ralph | 1428a |
| 1426b | Task #2 | John | 1428b |
| 1426c | Task #3 | John | 1428c |
| 1426d | Task #4 | Sam, Jordan | 1428d |

1426 — (Task column) ; 1428 — (Assigned to: column)

1450

| | To-Do | Due Date | |
|---|---|---|---|
| 1452a | Task #4 | Tomorrow | |
| 1452b | Sub-Task A | Today | |
| 1452c | Sub-Task B | Today | |

1452 — (To-Do column) ; 1454 — (Due Date column)

| Subject | To | From | Date |
|---|---|---|---|
| Task #1 Status | Ralph | John | August 5 |
| Re: Task #1 Status | John | Ralph | August 7 |
| Task #2 Deadline | John, Ralph | Jordan | August 12 |
| Task #4 Details | Jordan | John | August 15 |
| Task #3 Quote | Sam | Jordan | September 2 |

1502 — Subject
1504 — To
1506 — From
1508 — Date
1510

FIG. 15

DIGITAL PROCESSING SYSTEMS AND METHODS FOR CONTEXTUAL AUTO-POPULATION OF COMMUNICATIONS RECIPIENTS IN COLLABORATIVE WORK SYSTEMS

CROSS-REFERENCE TO RELATED APPLICATIONS

This application is based on and claims benefit of priority of U.S. Nonprovisional patent application Ser. No. 17/242,452 filed on Apr. 28, 2021, which claims priority to U.S. Provisional Patent Application No. 63/018,593, filed May 1, 2020, U.S. Provisional Patent Application No. 63/019,396, filed May 3, 2020, U.S. Provisional Patent Application No. 63/078,301, filed Sep. 14, 2020, U.S. Provisional Patent Application No. 63/121,803, filed on Dec. 4, 2020, U.S. Provisional Patent Application No. 63/122,439, filed on Dec. 7, 2020, and U.S. Provisional Patent Application No. 63/148,092, filed on Feb. 10, 2021, the contents of all of which are incorporated herein by reference in their entireties.

TECHNICAL FIELD

Embodiments consistent with the present disclosure include systems and methods for collaborative work systems. The disclosed systems and methods may be implemented using a combination of conventional hardware and software as well as specialized hardware and software, such as a machine constructed and/or programmed specifically for performing functions associated with the disclosed method steps. Consistent with other disclosed embodiments, non-transitory computer-readable storage media may store program instructions, which may be executable by at least one processing device and perform any of the steps and/or methods described herein.

BACKGROUND

Operation of modern enterprises can be complicated and time consuming. In many cases, managing the operation of a single project requires integration of several employees, departments, and other resources of the entity. To manage the challenging operation, project management software applications may be used. Such software applications allow a user to organize, plan, and manage resources by providing project-related information in order to optimize the time and resources spent on each project. It would be useful to improve these software applications to increase operation management efficiency.

SUMMARY

Some embodiments of the present disclosure provide unconventional approaches to maintaining an integrated unified filing engine, which may lead to a more effective collaborative work environment. Some such disclosed embodiments may integrate a unified filing engine within a workflow management system that may permit files to be associated with entries in the workflow management system. Some disclosed embodiments may involve systems, methods, and computer readable media relating to a workflow management system having an integrated unified filing engine. These embodiments may involve at least one processor configured to maintain at least one table of the workflow management system, the at least one table containing a plurality of items and a plurality of asset designations, each asset designation being associated with at least one of the plurality of items; maintain at least one electronic whiteboard containing at least a subset of the plurality of asset designations; maintain a data structure containing a plurality of links, wherein each link associates at least one of the subsets of asset designations with at least one location on the at least one electronic whiteboard; receive via a network access device having a display presenting the at least one table, an activation of a particular link associated with a particular asset; in response to the activation of the particular link, alter the display to present at least a particular location on the at least one electronic whiteboard containing a particular asset designation corresponding to the particular asset, wherein the particular location includes a cluster of additional asset designations related to the particular asset; receive a selection of at least one of the additional asset designations or the particular asset designation; in response to the selection, retrieve a corresponding asset; and cause the corresponding asset to be presented on the display.

Consistent with some disclosed embodiments, an enterprise messaging system for message mediation and verification is disclosed. The enterprise system may include at least one processor to perform a variety of functions. The functions may include maintaining a plurality of interconnected boards. A first group of at least some of the plurality of interconnected boards may include items that contain external contact addresses. A second group of at least some of the plurality of interconnected boards may omit external contact addresses. A mediator overlay on the enterprise messaging system may monitor contact addresses of incoming messages and compare a contact address of a specific incoming message against a repository of addresses associated with the first group of at least some of the plurality of interconnected boards. In response to a match between the contact address of the specific incoming message and at least one address contained in the repository, at least one primary duplicate message of the specific incoming message maybe generated and may be associated with each board of the first group of at least some of the plurality of interconnected boards. At least one linked board of the second group may be determined for each of the first group having the at least one primary duplicate message associated therewith. At least one secondary duplicate message of the specific incoming message may be generated for the at least one linked board of the second group. The at least one secondary duplicate message may be associated with the at least one linked board of the second group.

Some embodiments of the present disclosure provide unconventional approaches to enterprise messaging systems, which may lead to more accurate and precise auto-population of recipient fields with external addresses. Some such disclosed embodiments integrate enterprise messaging within a workflow management system, permitting the auto-populating of recipient fields to be based on data contained within the workflow management system. Some disclosed embodiments may involve systems, methods, and computer readable media relating to an enterprise messaging system for auto-populating recipient fields based on context of source content. These embodiments may involve at least one processor configured to maintain a plurality of boards related to a common entity, wherein each board of the plurality of boards includes differing external addresses; receive an indication of an intent to send a communication, the indication originating from a specific board of the plurality of boards; in response to receiving the indication, render a communication interface associated with the specific board; perform a look up of a subset of the plurality of boards linked to the specific board; retrieve external addresses from each of the subset of the plurality of boards; populate the communication interface with the communication and the retrieved external addresses; receive a selection of at least one of the retrieved external addresses; cause the communication to be transmitted to the at least one selected retrieved external address; and link a copy of the transmitted communication to at least the specific board.

BRIEF DESCRIPTION OF THE DRAWINGS

FIG. 4 illustrates an exemplary table of a workflow management system containing a plurality of items and asset designations, consistent with some embodiments of the present disclosure.

FIG. 5 illustrates an exemplary list view of an electronic whiteboard corresponding to an integrated unified filing engine, consistent with some embodiments of the present disclosure.

FIG. 14 illustrates simplified exemplary interconnected boards, consistent with some embodiments of the present disclosure.

FIG. 15 illustrates an exemplary presentation of messages, consistent with some embodiments of the present disclosure.

DETAILED DESCRIPTION

Figure 1:
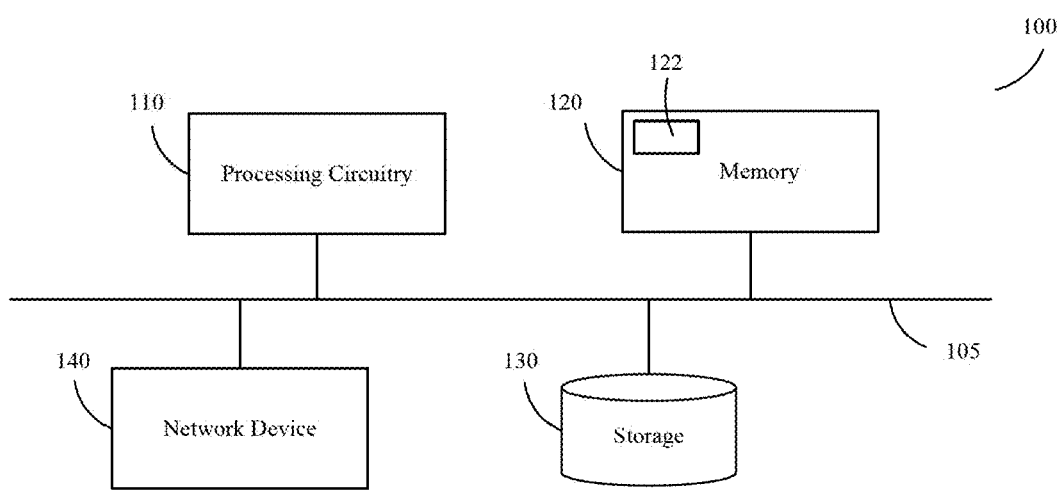
FIG. 1 is a block diagram of an exemplary computing device which may be employed in connection with embodiments of the present disclosure.

Exemplary embodiments are described with reference to the accompanying drawings. The figures are not necessarily drawn to scale. While examples and features of disclosed principles are described herein, modifications, adaptations, and other implementations are possible without departing from the spirit and scope of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It should also be noted that as used herein and in the appended claims, the singular forms "a," "an," and "the" include plural references unless the context clearly dictates otherwise.

In the following description, various working examples are provided for illustrative purposes. However, is to be understood the present disclosure may be practiced without one or more of these details.

Throughout, this disclosure mentions "disclosed embodiments," which refer to examples of inventive ideas, concepts, and/or manifestations described herein. Many related and unrelated embodiments are described throughout this disclosure. The fact that some "disclosed embodiments" are described as exhibiting a feature or characteristic does not mean that other disclosed embodiments necessarily share that feature or characteristic.

This disclosure presents various mechanisms for collaborative work systems. Such systems may involve software that enables multiple users to work collaboratively. By way of one example, workflow management software may enable various members of a team to cooperate via a common online platform. It is intended that one or more aspects of any mechanism may be combined with one or more aspect of any other mechanisms, and such combinations are within the scope of this disclosure.

This disclosure is provided for the convenience of the reader to provide a basic understanding of a few exemplary embodiments and does not wholly define the breadth of the disclosure. This disclosure is not an extensive overview of all contemplated embodiments and is intended to neither identify key or critical elements of all embodiments nor to delineate the scope of any or all aspects. Its sole purpose is to present some features of one or more embodiments in a simplified form as a prelude to the more detailed description presented later. For convenience, the term "certain embodiments" or "exemplary embodiment" may be used herein to refer to a single embodiment or multiple embodiments of the disclosure.

Certain embodiments disclosed herein include devices, systems, and methods for collaborative work systems that may allow a user to interact with information in real time. To avoid repetition, the functionality of some embodiments is described herein solely in connection with a processor or at least one processor. It is to be understood that such exemplary descriptions of functionality applies equally to methods and computer readable media and constitutes a written description of systems, methods, and computer readable media. The platform may allow a user to structure the system in many ways with the same building blocks to represent what the user wants to manage and how the user wants to manage it. This may be accomplished through the use of boards. A board may be a table with items (e.g., individual items presented in horizontal rows) defining objects or entities that are managed in the platform (task, project, client, deal, etc.). Unless expressly noted otherwise, the terms "board" and "table" may be considered synonymous for purposes of this disclosure. In some embodiments, a board may contain information beyond which is displayed in a table. Boards may include sub-boards that may have a separate structure from a board. Sub-boards may be tables with sub-items that may be related to the items of a board. Columns intersecting with rows of items may together define cells in which data associated with each item may be maintained. Each column may have a heading or label defining an associated data type. When used herein in combination with a column, a row may be presented horizontally and a column vertically. However, in the broader generic sense as used herein, the term "row" may refer to one or more of a horizontal and a vertical presentation. A table or tablature as used herein, refers to data presented in horizontal and vertical rows, (e.g., horizontal rows and vertical columns) defining cells in which data is presented. Tablature may refer to any structure for presenting data in an organized manner, as previously discussed. such as cells presented in horizontal rows and vertical columns, vertical rows and horizontal columns, a tree data structure, a web chart, or any other structured representation, as explained throughout this disclosure. A cell may refer to a unit of information contained in the tablature defined by the structure of the tablature. For example, a cell may be defined as an intersection between a horizontal row with a vertical column in a tablature having rows and columns. A cell may also be defined as an intersection between a horizontal and a vertical row, or an intersection between a horizontal and a vertical column. As a further example, a cell may be defined as a node on a web chart or a node on a tree data structure. As would be appreciated by a skilled artisan, however, the disclosed embodiments are not limited to any specific structure, but rather may be practiced in conjunction with any desired organizational arrangement. In addition, a tablature may include any suitable information. When used in conjunction with a workflow management application, the tablature may include any information associated with one or more tasks, such as one or more status values, projects, countries, persons, teams, progresses, a combination thereof, or any other information related to a task.

While a table view may be one way to present and manage the data contained on a board, a table's or board's data may be presented in different ways. For example, in some embodiments, dashboards may be utilized to present or summarize data derived from one or more boards. A dashboard may be a non-table form of presenting data, using for example static or dynamic graphical representations. A dashboard may also include multiple non-table forms of presenting data. As discussed later in greater detail, such representations may include various forms of graphs or graphics. In some instances, dashboards (which may also be referred to more generically as "widgets") may include tablature. Software links may interconnect one or more boards with one or more dashboards thereby enabling the dashboards to reflect data presented on the boards. This may allow, for example, data from multiple boards to be displayed and/or managed from a common location. These widgets may provide visualizations that allow a user to update data derived from one or more boards.

Boards (or the data associated with boards) may be stored in a local memory on a user device or may be stored in a local network repository. Boards may also be stored in a remote repository and may be accessed through a network. In some instances, permissions may be set to limit board access to the board's "owner" while in other embodiments a user's board may be accessed by other users through any of the networks described in this disclosure. When one user makes a change in a board, that change may be updated to the board stored in a memory or repository and may be pushed to the other user devices that access that same board. These changes may be made to cells, items, columns, boards, dashboard views, logical rules, or any other data associated with the boards. Similarly, when cells are tied together or are mirrored across multiple boards, a change in one board may cause a cascading change in the tied or mirrored boards or dashboards of the same or other owners.

Various embodiments are described herein with reference to a system, method, device, or computer readable medium. It is intended that the disclosure of one is a disclosure of all. For example, it is to be understood that disclosure of a computer readable medium described herein also constitutes a disclosure of methods implemented by the computer readable medium, and systems and devices for implementing those methods, via for example, at least one processor. It is to be understood that this form of disclosure is for ease of discussion only, and one or more aspects of one embodiment herein may be combined with one or more aspects of other embodiments herein, within the intended scope of this disclosure.

Embodiments described herein may refer to a non-transitory computer readable medium containing instructions that when executed by at least one processor, cause the at least one processor to perform a method. Non-transitory computer readable mediums may be any medium capable of storing data in any memory in a way that may be read by any computing device with a processor to carry out methods or any other instructions stored in the memory. The non-transitory computer readable medium may be implemented as hardware, firmware, software, or any combination thereof. Moreover, the software may preferably be implemented as an application program tangibly embodied on a program storage unit or computer readable medium consisting of parts, or of certain devices and/or a combination of devices. The application program may be uploaded to, and executed by, a machine comprising any suitable architecture. Preferably, the machine may be implemented on a computer platform having hardware such as one or more central processing units ("CPUs"), a memory, and input/output interfaces. The computer platform may also include an operating system and microinstruction code. The various processes and functions described in this disclosure may be either part of the microinstruction code or part of the application program, or any combination thereof, which may be executed by a CPU, whether or not such a computer or processor is explicitly shown. In addition, various other peripheral units may be connected to the computer platform such as an additional data storage unit and a printing unit. Furthermore, a non-transitory computer readable medium may be any computer readable medium except for a transitory propagating signal.

The memory may include a Random Access Memory (RAM), a Read-Only Memory (ROM), a hard disk, an optical disk, a magnetic medium, a flash memory, other permanent, fixed, volatile or non-volatile memory, or any other mechanism capable of storing instructions. The memory may include one or more separate storage devices collocated or disbursed, capable of storing data structures, instructions, or any other data. The memory may further include a memory portion containing instructions for the processor to execute. The memory may also be used as a working scratch pad for the processors or as a temporary storage.

Some embodiments may involve at least one processor. A processor may be any physical device or group of devices having electric circuitry that performs a logic operation on input or inputs. For example, the at least one processor may include one or more integrated circuits (IC), including application-specific integrated circuit (ASIC), microchips, microcontrollers, microprocessors, all or part of a central processing unit (CPU), graphics processing unit (GPU), digital signal processor (DSP), field-programmable gate array (FPGA), server, virtual server, or other circuits suitable for executing instructions or performing logic operations. The instructions executed by at least one processor may, for example, be pre-loaded into a memory integrated with or embedded into the controller or may be stored in a separate memory.

In some embodiments, the at least one processor may include more than one processor. Each processor may have a similar construction, or the processors may be of differing constructions that are electrically connected or disconnected from each other. For example, the processors may be separate circuits or integrated in a single circuit. When more than one processor is used, the processors may be configured to operate independently or collaboratively. The processors may be coupled electrically, magnetically, optically, acoustically, mechanically or by other means that permit them to interact.

Consistent with the present disclosure, disclosed embodiments may involve a network. A network may constitute any type of physical or wireless computer networking arrangement used to exchange data. For example, a network may be the Internet, a private data network, a virtual private network using a public network, a Wi-Fi network, a LAN or WAN network, and/or other suitable connections that may enable information exchange among various components of the system. In some embodiments, a network may include one or more physical links used to exchange data, such as Ethernet, coaxial cables, twisted pair cables, fiber optics, or any other suitable physical medium for exchanging data. A network may also include a public switched telephone network ("PSTN") and/or a wireless cellular network. A network may be a secured network or unsecured network. In other embodiments, one or more components of the system may communicate directly through a dedicated communication network. Direct communications may use any suitable technologies, including, for example, BLUETOOTH™, BLUETOOTH LE™ (BLE), Wi-Fi, near field communications (NFC), or other suitable communication methods that provide a medium for exchanging data and/or information between separate entities.

Certain embodiments disclosed herein may also include a computing device for generating features for work collaborative systems, the computing device may include processing circuitry communicatively connected to a network interface and to a memory, wherein the memory contains instructions that, when executed by the processing circuitry, configure the computing device to receive from a user device associated with a user account instruction to generate a new column of a single data type for a first data structure, wherein the first data structure may be a column oriented data structure, and store, based on the instructions, the new column within the column-oriented data structure repository, wherein the column-oriented data structure repository may be accessible and may be displayed as a display feature to the user and at least a second user account. The computing devices may be devices such as mobile devices, desktops, laptops, tablets, or any other devices capable of processing data. Such computing devices may include a display such as an LED display, augmented reality (AR), virtual reality (VR) display.

Certain embodiments disclosed herein may include a processor configured to perform methods that may include triggering an action in response to an input. The input may be from a user action or from a change of information contained in a user's table, in another table, across multiple tables, across multiple user devices, or from third-party applications. Triggering may be caused manually, such as through a user action, or may be caused automatically, such as through a logical rule, logical combination rule, or logical templates associated with a board. For example, a trigger may include an input of a data item that is recognized by at least one processor that brings about another action.

In some embodiments, the methods including triggering may cause an alteration of data and may also cause an alteration of display of data contained in a board or in memory. An alteration of data may include a recalculation of data, the addition of data, the subtraction of data, or a rearrangement of information. Further, triggering may also cause a communication to be sent to a user, other individuals, or groups of individuals. The communication may be a notification within the system or may be a notification outside of the system through a contact address such as by email, phone call, text message, video conferencing, or any other third-party communication application.

Some embodiments include one or more of automations, logical rules, logical sentence structures and logical (sentence structure) templates. While these terms are described herein in differing contexts, in a broadest sense, in each instance an automation may include a process that responds to a trigger or condition to produce an outcome; a logical rule may underly the automation in order to implement the automation via a set of instructions; a logical sentence structure is one way for a user to define an automation; and a logical template/logical sentence structure template may be a fill-in-the-blank tool used to construct a logical sentence structure. While all automations may have an underlying logical rule, all automations need not implement that rule through a logical sentence structure. Any other manner of defining a process that respond to a trigger or condition to produce an outcome may be used to construct an automation.

Other terms used throughout this disclosure in differing exemplary contexts may generally share the following common definitions.

In some embodiments, machine learning algorithms (also referred to as machine learning models or artificial intelligence in the present disclosure) may be trained using training examples, for example in the cases described below. Some non-limiting examples of such machine learning algorithms may include classification algorithms, data regressions algorithms, image segmentation algorithms, visual detection algorithms (such as object detectors, face detectors, person detectors, motion detectors, edge detectors, etc.), visual recognition algorithms (such as face recognition, person recognition, object recognition, etc.), speech recognition algorithms, mathematical embedding algorithms, natural language processing algorithms, support vector machines, random forests, nearest neighbors algorithms, deep learning algorithms, artificial neural network algorithms, convolutional neural network algorithms, recursive neural network algorithms, linear machine learning models, non-linear machine learning models, ensemble algorithms, and so forth. For example, a trained machine learning algorithm may comprise an inference model, such as a predictive model, a classification model, a regression model, a clustering model, a segmentation model, an artificial neural network (such as a deep neural network, a convolutional neural network, a recursive neural network, etc.), a random forest, a support vector machine, and so forth. In some examples, the training examples may include example inputs together with the desired outputs corresponding to the example inputs. Further, in some examples, training machine learning algorithms using the training examples may generate a trained machine learning algorithm, and the trained machine learning algorithm may be used to estimate outputs for inputs not included in the training examples. In some examples, engineers, scientists, processes and machines that train machine learning algorithms may further use validation examples and/or test examples. For example, validation examples and/or test examples may include example inputs together with the desired outputs corresponding to the example inputs, a trained machine learning algorithm and/or an intermediately trained machine learning algorithm may be used to estimate outputs for the example inputs of the validation examples and/or test examples, the estimated outputs may be compared to the corresponding desired outputs, and the trained machine learning algorithm and/or the intermediately trained machine learning algorithm may be evaluated based on a result of the comparison. In some examples, a machine learning algorithm may have parameters and hyper parameters, where the hyper parameters are set manually by a person or automatically by a process external to the machine learning algorithm (such as a hyper parameter search algorithm), and the parameters of the machine learning algorithm are set by the machine learning algorithm according to the training examples. In some implementations, the hyper-parameters are set according to the training examples and the validation examples, and the parameters are set according to the training examples and the selected hyper-parameters.

FIG. 1 is a block diagram of an exemplary computing device 100 for generating a column and/or row oriented data structure repository for data consistent with some embodiments. The computing device 100 may include processing circuitry 110, such as, for example, a central processing unit (CPU). In some embodiments, the processing circuitry 110 may include, or may be a component of, a larger processing unit implemented with one or more processors. The one or more processors may be implemented with any combination of general-purpose microprocessors, microcontrollers, digital signal processors (DSPs), field programmable gate array (FPGAs), programmable logic devices (PLDs), controllers, state machines, gated logic, discrete hardware components, dedicated hardware finite state machines, or any other suitable entities that can perform calculations or other manipulations of information. The processing circuitry such as processing circuitry 110 may be coupled via a bus 105 to a memory 120.

The memory 120 may further include a memory portion 122 that may contain instructions that when executed by the processing circuitry 110, may perform the method described in more detail herein. The memory 120 may be further used as a working scratch pad for the processing circuitry 110, a temporary storage, and others, as the case may be. The memory 120 may be a volatile memory such as, but not limited to, random access memory (RAM), or non-volatile memory (NVM), such as, but not limited to, flash memory. The processing circuitry 110 may be further connected to a network device 140, such as a network interface card, for providing connectivity between the computing device 100 and a network, such as a network 210, discussed in more detail with respect to FIG. 2 below. The processing circuitry 110 may be further coupled with a storage device 130. The storage device 130 may be used for the purpose of storing single data type column-oriented data structures, data elements associated with the data structures, or any other data structures. While illustrated in FIG. 1 as a single device, it is to be understood that storage device 130 may include multiple devices either collocated or distributed.

The processing circuitry 110 and/or the memory 120 may also include machine-readable media for storing software. "Software" as used herein refers broadly to any type of instructions, whether referred to as software, firmware, middleware, microcode, hardware description language, or otherwise. Instructions may include code (e.g., in source code format, binary code format, executable code format, or any other suitable format of code). The instructions, when executed by the one or more processors, may cause the processing system to perform the various functions described in further detail herein.

Figure 2:
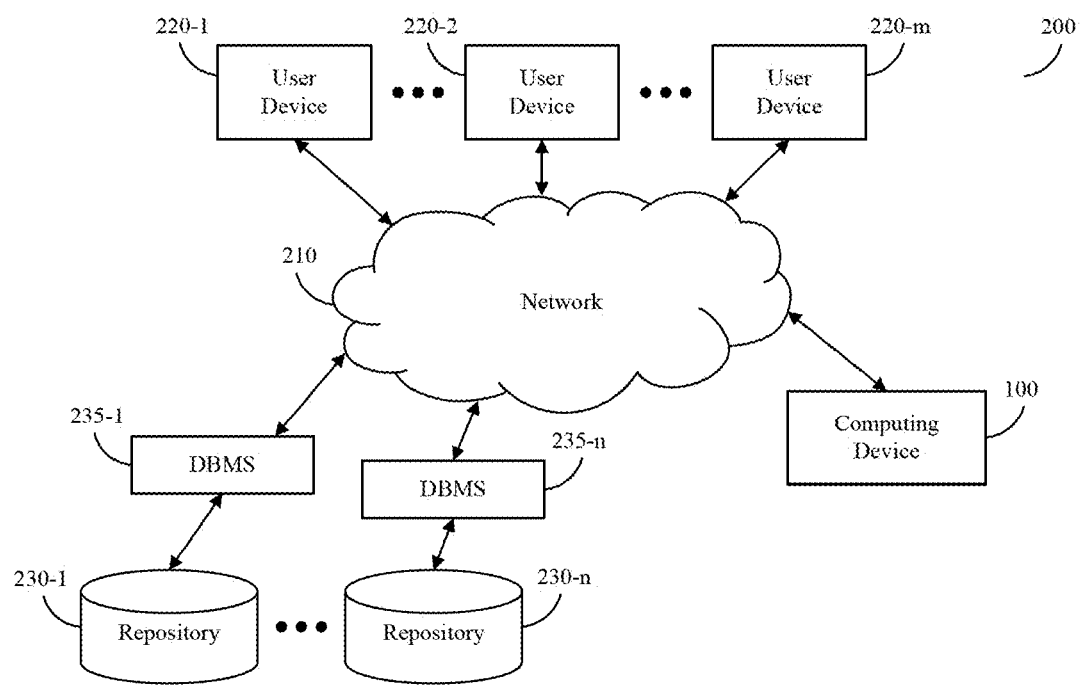
FIG. 2 is a block diagram of an exemplary computing architecture for collaborative work systems, consistent with embodiments of the present disclosure.

FIG. 2 is a block diagram of computing architecture 200 that may be used in connection with various disclosed embodiments. The computing device 100, as described in connection with FIG. 1, may be coupled to network 210. The network 210 may enable communication between different elements that may be communicatively coupled with the computing device 100, as further described below. The network 210 may include the Internet, the world-wide-web (WWW), a local area network (LAN), a wide area network (WAN), a metro area network (MAN), and other networks capable of enabling communication between the elements of the computing architecture 200. In some disclosed embodiments, the computing device 100 may be a server deployed in a cloud computing environment.

One or more user devices 220-1 through user device 220-m, where 'm' in an integer equal to or greater than 1, referred to individually as user device 220 and collectively as user devices 220, may be communicatively coupled with the computing device 100 via the network 210. A user device 220 may be for example, a smart phone, a mobile phone, a laptop, a tablet computer, a wearable computing device, a personal computer (PC), a smart television and the like. A user device 220 may be configured to send to and receive from the computing device 100 data and/or metadata associated with a variety of elements associated with single data type column-oriented data structures, such as columns, rows, cells, schemas, and the like.

One or more data repositories 230-1 through data repository 230-n, where 'n' in an integer equal to or greater than 1, referred to individually as data repository 230 and collectively as data repository 230, may be communicatively coupled with the computing device 100 via the network 210, or embedded within the computing device 100. Each data repository 230 may be communicatively connected to the network 210 through one or more database management services (DBMS) 235-1 through DBMS 235-n. The data repository 230 may be for example, a storage device containing a database, a data warehouse, and the like, that may be used for storing data structures, data items, metadata, or any information, as further described below. In some embodiments, one or more of the repositories may be distributed over several physical storage devices, e.g., in a cloud-based computing environment. Any storage device may be a network accessible storage device, or a component of the computing device 100.

As previously discussed, there may be an unmet need for collaborative file sharing in a collaborative work environment, regardless of whether teams are working remotely or in an office setting. Some aspects of the present disclosure provides unconventional ways of providing such collaborative file sharing using a workflow management system which maintains an electronic whiteboard for storing and sharing files. Conventional approaches may be too rigid and might not encourage collaboration due to inefficiencies in transmitting and storing files across multiple accounts.

As a result, there is a need for unconventional approaches to enable entities to store and share digital files on an electronic whiteboard and associate the digital files to elements of a workflow management system through the techniques disclosed herein involving a table, an electronic whiteboard, a data structure containing links, receiving an activation of a link corresponding to an asset of the table, altering a display to present a location on the electronic whiteboard associated with the asset, receiving a selection of one of an asset designation corresponding or related to the asset, retrieving the asset corresponding to the selected asset designation, and causing the corresponding asset to be presented on the display.

Some embodiments of this disclosure may provide a technical solution to the challenging technical problem of data management and may relate to a workflow management system having an integrated unified filing engine, the system having at least one processor, such as the various processors, processing circuitry, or other processing structure described herein. Such solutions may be employed in collaborative work systems, including methods, systems, devices, and computer-readable media. For ease of discussion, references below to systems, methods, or computer readable media apply equally to all. For example, the discussion of functionality provided in a system is to be considered a disclosure of the same or similar functionality in a method or computer readable media. For example, some aspects may be implemented by a computing device or software running thereon. The computing device may include at least one processor (e.g., a CPU, GPU, DSP, FPGA, ASIC, or any circuitry for performing logical operations on input data), as discussed previously, to perform example operations and methods. Other aspects of such methods may be implemented over a network (e.g., a wired network, a wireless network, or both).

As another example, some aspects may be implemented as operations or program codes in a non-transitory computer-readable medium. The operations or program codes may be executed by at least one processor. Non-transitory computer readable media, as described herein, may be implemented as any combination of hardware, firmware, software, or any medium capable of storing data that is readable by any computing device with a processor for performing methods or operations represented by the stored data. in a broadest sense, the example methods are not limited to particular physical or electronic instrumentalities but rather may be accomplished using many different instrumentalities.

Aspects of some embodiments of this disclosure may be related to workflow, which in one sense may refer to a series of tasks or sub-functions electronically monitored, and collectively directed to completing an operation. In other instances, a workflow may involve an orchestrated and repeatable combination of tasks, data (e.g., columns, rows, boards, dashboards, solutions), activities, or guidelines that make up a process. By way of example, a workflow management system may utilize software that enables members of a team to cooperate via a common online platform (e.g., a website) by providing interconnected boards and communication integrations embedded in each of the interconnected boards. In the workflow management system, the system may provide workflows that enable automatic updates to a common dashboard that is shared among multiple client devices, and provide varying visualizations of information to enable teams to understand their performance and milestones. An integrated unified filing engine may refer to a software functionality block for consolidating one or more digital files associated with one or more entities in a collective data store, the one or more digital files having various parts or attributes linked or coordinated. The one or more digital files may include a text, programming language, video, presentation, audio, image, design, document, spreadsheet, tabular, virtual machine, a link or shortcut, an image file, a video file, a video game file, an audio file, a playlist file, an audio editing file, a drawing file, a graphic file, a presentation file, a spreadsheet file, a project management file, a pdf file, a page description file, a compressed file, a computer-aided design file, a database, a publishing file, a font file, a financial file, a library, a web page, a personal information manager file, a scientific data file, a security file, a source code file, or any other type of file which may be stored in a database.

Figure 3:
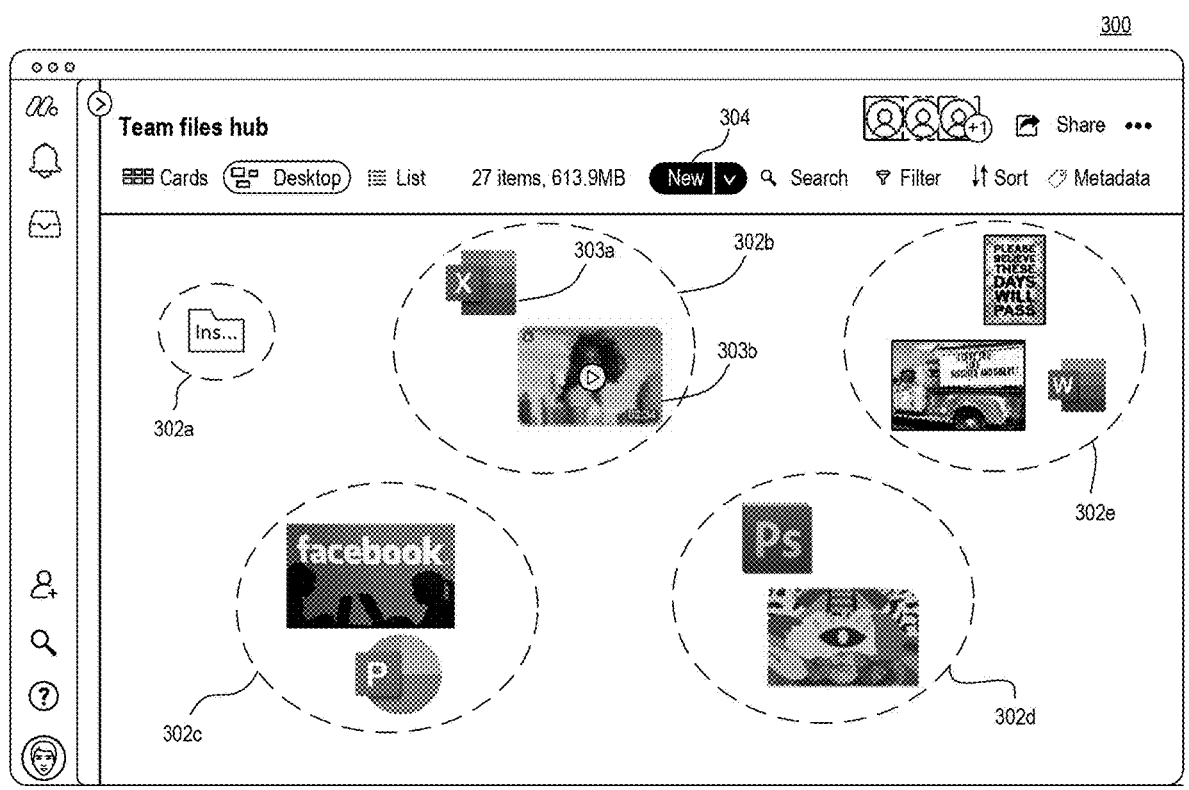
FIG. 3 illustrates an exemplary desktop view of an electronic whiteboard corresponding to an integrated unified filing engine, consistent with some embodiments of the present disclosure.

By way of example, FIG. 3 illustrates one example of an electronic whiteboard 300 corresponding to an integrated unified filing engine. Electronic whiteboard 300 may include one or more digital files associated with one or more entities, as discussed in greater detail below.

Consistent with some disclosed embodiments, the at least one processor may be configured to maintain at least one table of the workflow management system, the at least one table containing a plurality of items and a plurality of asset designations, each asset designation being associated with at least one of the plurality of items. A table of the workflow management system, in some instances, may include a data object with rows, columns, and cells at the intersections of the rows and columns that may contain data. A table may include any information such as items defining objects or entities that may be managed in a platform, the objects or entities presented in rows and columns defining cells in which data is contained, as described in greater detail below. Maintaining the table may refer to keeping the table in an existing or operating state and storing it in a repository. Additionally or alternatively, maintaining the table may refer to modifying the workflow table to correct faults or to improve performance or other attributes. Items may refer to one or more users, entities, associated or grouped entity (e.g., a group of users), property addresses, digital files, assets, and/or any object which may be stored in a row or column of a table. An asset designation may refer to an indication of whatever the at least one associated item may be. The indication may include an alphanumeric, graphic representation, or a combination thereof. For example, the indication may include a pdf icon, an image preview of a photograph, a string of numbers and letters, or any other symbol or piece of information which may be used to represent an item.

As an illustrative example, FIG-4 depicts an exemplary table 400 of a workflow management system containing a plurality of files 402a to 402j and corresponding file icons 404a to 404j, and a plurality of authors 406a to 406d and corresponding author icons 408a to 408d. The plurality of files 402a to 402j and authors 406a to 406d may be defined as items and the corresponding file icons 404a to 404j and author icons 408a to 408d may be defined as asset designations.

Consistent with some disclosed embodiments, the at least one processor may be configured to maintain at least one electronic whiteboard containing at least a subset of the plurality of asset designations. An electronic whiteboard may include a digital, visual workspace which may store information common to several users on which they may add files, annotate, draw, and otherwise edit the workspace. For example, an electronic whiteboard may store information in a visual space, such as by allowing multiple users to organize files into groups and place each group in a location of the space. A subset of the asset designations may include a part or all of the plurality of asset designations. For example, the at least one electronic whiteboard may contain a subset of the plurality of asset designations associated with one or more authors, owners, tasks or projects, items, subject matter, teams, deadlines, dates created, status, files, file types, file sizes, channels, metadata, labels, budgets, data sources, or any other appropriate grouping.

Figure 6:
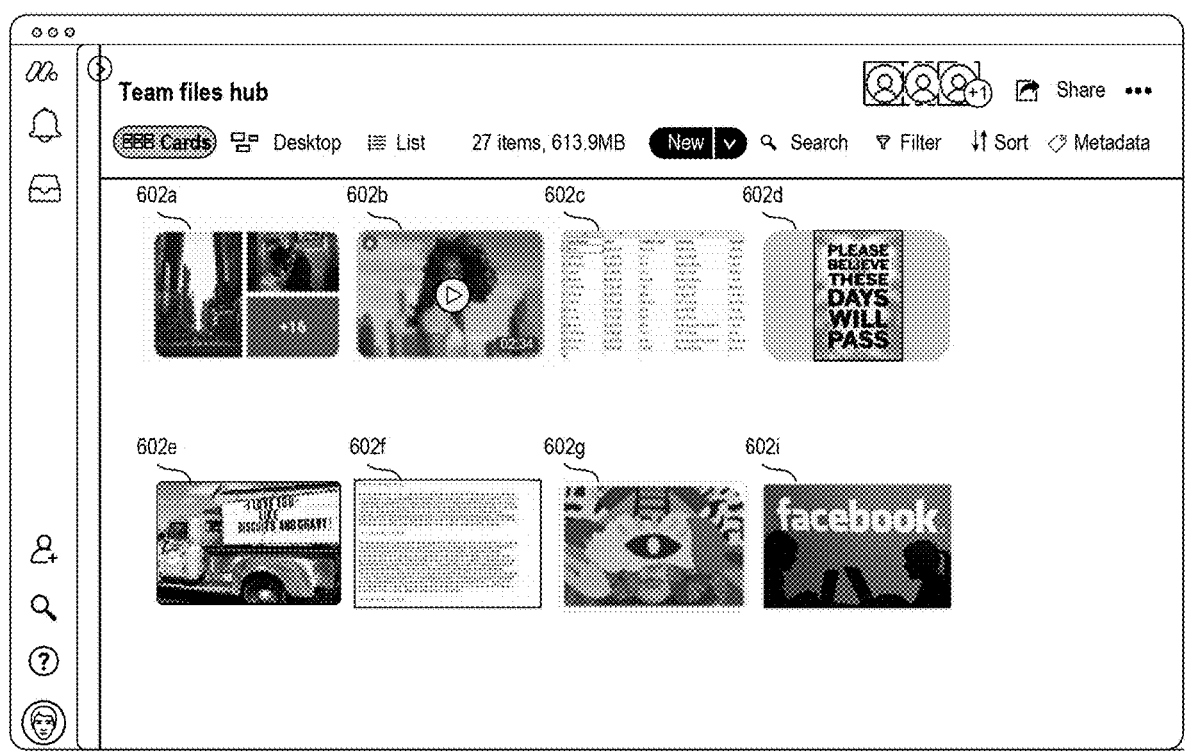
FIG. 6 illustrates an exemplary cards view of an electronic whiteboard corresponding to an integrated unified filing engine, consistent with some embodiments of the present disclosure.

For example, FIG. 3 depicts electronic whiteboard 300 containing a subset of the plurality of asset designations 404a to 404j of FIG. 4, represented as clusters 302a to 302e. Cluster 302a represents a subset containing file icon 404a; Cluster 302b represents a subset containing file icons 404b and 404c corresponding to files 404b and 404c of FIG. 4; cluster 302c represents a subset containing file icons corresponding to files 404i and 404j of FIG. 4; cluster 302d represents a subset containing file icons corresponding to files 404g and 404h of FIG. 4; and cluster 302e represents a subset containing file icons corresponding to files 404d to 404f of FIG. 4. In some embodiments, a file icon may include part of one or more clusters. An electronic whiteboard may also take different forms, as shown in the "Desktop" form of FIG. 3, the "List" form of FIG. 5, and the "Cards" form of FIG. 6 or any other presentation or format. These forms are merely exemplary and non-limiting. In some embodiments, the "Cards" form may include cards 602a to 602g and 602i corresponding to files 402a to 402g and 402i of FIG. 4. In other embodiments, each card may represent clusters 302a to 302e.

Consistent with some disclosed embodiments, the at least one processor may be configured to maintain a data structure containing a plurality of links, wherein each link associates at least one of the subsets of asset designations with at least one location on the at least one electronic whiteboard. A data structure may refer to a database or other system for organizing, managing, and storing a collection of data and relationships among them in a format which enables efficient access. A link may refer to any destination address which may include an address, hyperlink, inline link, anchor, or any other reference to data that an entity may activate to retrieve such data. For example, a link may point to an entire electronic whiteboard or to a specific element or location within the electronic whiteboard. A location on the at least one electronic whiteboard may refer to a particular area of the electronic whiteboard which may store items represented by asset designations. Items stored in a particular location may be grouped together based on one or more common attributes. For instance, items grouped in a same location may share a same author, owner, task or project, item, subject matter, team, deadline, date created, status, file, file type, file size, channel, metadata, label, budget, data source, or any other appropriate grouping.

As an illustrative example in FIG. 3, a data structure (not shown) may contain links associating clusters 302a to 302e to specific locations on electronic whiteboard 300. Inspiration file 404a in the electronic whiteboard 300 may be associated with a link that may be activated by an input, such as a selection of the graphical icon depicting Inspiration file 404a, to re-render a display to present the same Inspiration file 402a of FIG. 4 in view 400, or the same Inspiration file 502a in the List form shown in FIG. 5, or the same Inspiration file 602a in the Card form shown in FIG. 6. The same may occur to activate any of the Inspiration files of FIGS. 4 to 6 to re-render the display to present the Inspiration file 404a in the electronic whiteboard 300 of FIG. 3.

Consistent with some disclosed embodiments, the at least one processor may be configured to receive via a network access device having a display presenting the at least one table, an activation of a particular link associated with a particular asset. A network access device may include any computing device such as a mobile device, desktop, laptop, tablet, IOT, or any other device capable of accessing the system and receiving input from a user. A display may include an electronic device or part of an electronic device which may serve as the visual presentation of data. For example, a display may include a liquid crystal display (LCD), a light-emitting diode display (LED), a microLED, an electroluminescent display (ELD), an electrophoretic display, an active matrix organic light-emitting diode display (AMOLED), an organic light-emitting diode display (OLED), a quantum dot display (QD), a quantum light-emitting diode display (QLED), a vacuum florescent display (VFD), a digital light processing display (DLP), an interferometric modulator display (IMOD), a digital microshutter display (DMS), a plasma display, a neon display, a filament display, a surface-conduction electron-emitter display (SED), a field emission display (FED), Laser TV, a carbon nanotube display, a touch screen, projector, AR/VR lens, or any other suitable display for a network access device. Receiving an activation of a link may refer to receiving an input on an interface (e.g., mouse, keyboard, touchscreen) to indicate an intent to select or otherwise activate a link, or any other way of informing a device that an entity desires to reach an address associated with a link. A particular link may refer to one link among the plurality of links which an entity desires to activate. A particular asset may include one asset among the plurality of items which is associated with the particular link which the entity desires to activate.

By way of example, a link associated with a particular asset may be activated by a user through a network access device (not shown) presenting table 400 of FIG. 4. For example, the user may click on file 402a or file icon 404a to activate a link associated with file 402a, or may click on author 406a or author icon 408a to activate a link associated with author 406a.

Consistent with some disclosed embodiments, in response to the activation of the particular link, the at least one processor may be configured to alter the display to present at least a particular location on the at least one electronic whiteboard containing a particular asset designation corresponding to the particular asset, wherein the particular location includes a cluster of additional asset designations related to the particular asset. Altering the display may refer to sending a signal to the network access device to cause the display to re-render and present different information, a different amount of information, or the same information in a different form, or any combination thereof. For example, if a network access device is displaying a table, altering the display may involve sending a signal to the network access device to cause the network access device to display the electronic whiteboard. The electronic whiteboard may take different forms, for example, it may resemble a whiteboard with scattered items or items grouped in clusters, a board with a plurality of cards, each card containing one or more grouped items, a list, a table, a timeline showing when each item was uploaded, or any other means of presenting files in a space. Presenting at least a particular location on the at least one electronic whiteboard may refer to causing the display to render an area of the at least one electronic whiteboard associated with the activated link, such as a zoomed in rendering of one part of the electronic whiteboard, or a zoomed out view of the entire electronic whiteboard. A particular asset designation may include an asset designation among the plurality of asset designations which is associated with the particular asset. For example, the particular asset may include a digital file, including at least one of a text, video, audio, image, design, document, tabular, an image file, a video file, a drawing file, a graphic file, a presentation file, project management file, a webpage, or any other digital file as described previously above with reference to the items. A particular location may include a cluster of additional asset designations related to the particular asset may include another group of one or more asset designations which may share one or more common attributes with the particular asset. A particular location of the at least one electronic whiteboard may present a single cluster of particular asset designations (e.g., files) associated with a particular asset (e.g., all files related to a common project), or the particular location may also present additional clusters that are related to the particular asset in a manner that may indicate an association between the clusters, such as by proximity, color coding, labeling, or any other indication. For instance, the cluster of additional asset designations may be based on at least one of an author, owner, task or project, item, subject matter, team, deadline, date created, status, file, file type, file size, channel, metadata, label, budget, data source, or any other appropriate attribute for grouping. This cluster of additional asset designations may, for example, be associated with a particular asset because of a common attribute of having a common author of the particular asset. As a result, the system may present a cluster of asset designations related to a particular asset (e.g., files related to a common project) and an additional cluster of asset designations that might not necessarily be related to the particular asset (e.g., files related to a different project) in a particular location because of the shared common attribute that both clusters are related to a common author.

Consistent with some disclosed embodiments, the at least one processor may be configured to receive a selection of at least one of the additional asset designations or the particular asset designation. Receiving a selection of at least one of the additional asset designations or the particular asset designation may refer to the at least one processor receiving, from an entity, a choice of one or more of the asset designations associated with the particular asset designation or the asset designation itself through an interface as described previously above. For example, the selection may be received by means of any of a keyboard, mouse, microphone, camera, touchpad, touchscreen, graphics tablet, scanner, switch, joystick, or any other appropriate input device. Receiving a selection may involve an entity preselecting an additional asset designation or the particular asset designation by clicking, hovering over with a cursor, or any other method of preselecting an item. Preselecting an asset designation may cause the at least one processor to provide the network access device with a preview of the asset associated with the preselected asset designation. The preview may include a facility for inspecting the appearance or the metadata of an item before it is retrieved.

In some embodiments, at least one of the additional asset designations of the cluster may be associated with a differing asset from the particular asset. For instance, in a cluster of a particular asset, such as a document of a project with additional asset designations (e.g., other files related to the same project), one of the additional asset designations may be associated with an asset different from the particular asset because the additional asset designations may be associated with multiple projects. In other embodiments, at least one of the additional asset designations of the cluster is activatable to access information of another table. For example, an additional asset designation may be associated with a table of the workflow management system different from the table the particular asset is associated to because the additional asset (e.g., a document) may be associated with projects of a first table and projects of a second table. In this example, an entity may activate said additional asset designation to cause the at least one processor to retrieve information of the different table.

By way of example, a user who is being presented cluster 302b of electronic whiteboard 300 of FIG. 3 may select one of file icons 404b or 404c, which may be associated or linked to the assets presented with asset designations 404b or 404c of FIG. 4 (which may be of another table). The at least one processor may receive the selection, e.g., of file icon 303b. The user may select file icon 303b by clicking on it with a mouse or using a touchscreen, or by any of the methods discussed.

In another example, a user may be presented with a table in view 400 of FIG. 4. The user may select asset designation 404b (e.g., the particular asset being a video file), which may be a link that may cause the system to re-render the display to present the electronic whiteboard 300 of FIG. 3 and present the corresponding particular asset designation 303b of the particular asset in a cluster 302b, which contains an additional asset designation 404c (e.g., an Excel file). While the additional asset designation 404c may be associated with the particular asset and its designation 404b, the additional asset designation 404c may also be associated with a different asset, such as differing asset designation 404a of FIG. 3. As such, the system may present the cluster 302b in close proximity to a cluster containing differing asset designation 302a to indicate a relationship between the two clusters in that particular location of the electronic whiteboard 300.

In other embodiments, an entity may request to view metadata relating to each item. For example, a user may request to see one or more of a file name, file type, owner, author, date, number of items, status, version, tags, description or any other metadata relating to an item. The at least one processor may retrieve the metadata relating to each item and cause the network access device to present it to the entity, for example, by overlaying the metadata on top of or near the respective item. Additionally or alternatively, metadata may be presented to an entity when said entity selects an asset designation associated with an item.

In some embodiments, an entity may request to search, filter, and sort items. Searching for an item in the electronic whiteboard may involve inputting, by the entity, data which may allow the at least one processor to perform a search within the electronic whiteboard for one or more items associated with the data. Additionally or alternatively, items may be filtered and/or be sorted by attribute (e.g., author, owner, date, tag, status). Filtering may refer to the process of assessing items in order to select or remove one or more items from the plurality of items. Sorting may refer to the process of arranging items systematically by arranging items in a sequence ordered by some criterion, grouping items with similar properties, or providing any other arrangement of items. When searching, filtering, and/or sorting, the requesting entity may be provided with a view of the electronic whiteboard which includes a timeline. The timeline may include the asset designations associated with the search, filter, and/or sort item results ordered by when they were uploaded, when they were last modified, when they were last viewed, or any other ordering condition. The entity may then select one or more items from the timeline to be presented in another view, or may select one or more items for retrieval by the at least one processor.

For example, in response to the activation of a link associated with file 402a of FIG. 4, the at least one processor may alter the display of a network access device to present the location associated with file 402a, i.e., the location of cluster 302a on electronic whiteboard 300, which contains file icon 404a corresponding to file 402a. As another example, in response to the activation of a link associated with file 404b, the at least one processor may alter the display to present the location of cluster 302b on electronic whiteboard 300, which contains file icon 404b corresponding to file 402b, and file icon 404c corresponding to file 402c. In this example, file icon 404c may be related to file 402b and a part of cluster 302b because a user placed them together on electronic whiteboard 300, because of semantic analysis performed by the at least one processor which recognizes "New York" in both file names, or for any other appropriate reason. Further, file icon 404c may related to a table other than table 400 and may be activatable to access information of this table. As yet another example, if a link associated with file 404d is activated, the at least one processor may alter the display to present the location of cluster 302c on electronic whiteboard 300, which contains file icon 404d corresponding to file 402d, and file icon 404e corresponding to file 402e. In this example, file icon 404e may be related to file 402d and a part of cluster 302c because the "Author" is the same for both, in this case, "Jerome Clay."

Figure 7:
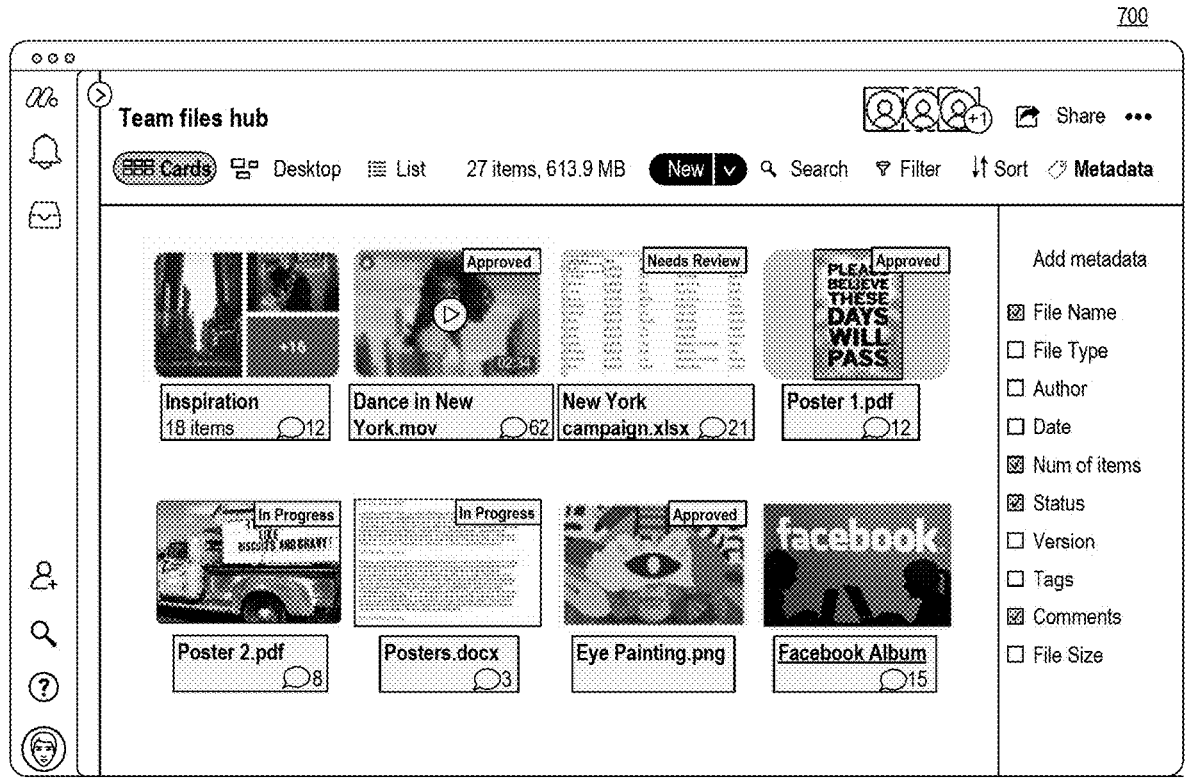
FIG. 7 illustrates an exemplary cards view of an electronic whiteboard corresponding to an integrated unified filing engine including metadata related to files, consistent with some embodiments of the present disclosure.

As an illustrative example, FIG. 7 depicts an exemplary electronic whiteboard 700 where an entity may request to view metadata relating to each item. In this example, a user has selected to view the "File Name," "Num of items," "Status," and "Comments" for each item. The user may also select "File Type," "Author," "Date," "Version," "Tags," "File Size," and/or any other appropriate metadata related to the items. The selected metadata may be presented underneath the asset designation, such as with "File Name," "Num of items," and "Comments," overlaid over the asset designation, such as with "Status," or presented in any other way which may convey information about each file to an entity. Additionally or alternatively, all or some of the metadata may be presented to the entity after an item is selected.

Consistent with some disclosed embodiments, in response to the selection, the at least one processor may be configured to retrieve a corresponding asset. Retrieving a corresponding asset may refer to the at least one processor, based on the selection, locating and returning an asset or item associated with the selected additional asset designation or particular asset designation. The at least one processor may be configured to then cause the corresponding asset to be presented on the display. Causing the corresponding asset to be presented on the display may refer to sending a signal to the network access device to render the corresponding asset on the display. For example, in response to the selection of a particular asset and its designation in an electronic whiteboard, the system may retrieve the particular asset (e.g., a word document) and display the particular asset in its native format in a new window, pop-up, or in any other presentation.

Continuing the above example, after receiving the selection of file icon 404b, the at least one processor may retrieve the file corresponding to file icon 404b, i.e., file 402b, and perform additional operations such as transmitting the file or presenting the file in its native format (not shown) on a display, projection, or lens of a network access device.

Consistent with some disclosed embodiments, the at least one processor may be further configured to receive an alteration to the presented corresponding asset, wherein the alteration causes sending a notification to an entity associated with the presented corresponding asset. Receiving an alteration to the presented corresponding asset may include receiving an input indication an instruction for addition, deletion, reassignment, rearrangement, renaming, or any other type of modification to the corresponding asset presented on the display via any interface such as through the network access device. Additionally or alternatively, the at least one processor may be further configured to receive an alteration to an asset designation or to a location on the electronic whiteboard. Notifications may be sent to the entity associated with the presented corresponding asset when certain an alteration or a certain action is made on an item of the electronic whiteboard. Sending a notification may include transmitting any alert such as a message, a graphical indication, an audio indication, or any combination thereof. For example, if a user were to merely open and view an item, the author of that item may receive a notification that the user has accessed the item, so that the author is made aware of any access or alterations made to the author's item. In this scenario, the system may send a notification to the author by sending a text message that the item has been accessed by another user. As another example, a user may alter a presented asset by annotating an item, asset designation, or a location on the electronic whiteboard with a note, and the message in the note may be sent directly to the author of that item through a notification. Similar annotations may include overlaid drawings, emoticons, images, or any other annotation which may be superimposed over an asset designation or location of the electronic whiteboard. In other embodiments, the note annotation may be sent as a message to all team members who are associated with the item. Notifications may also provide an entity with an updated location of the whiteboard and may show all the modifications that were made to the location since the entity was last provided the whiteboard. In some embodiments, the alteration may include an entity-specific tag which will directly notify this entity that they have been tagged on the corresponding asset regardless of whether they are associated to the corresponding asset.

Figure 8:
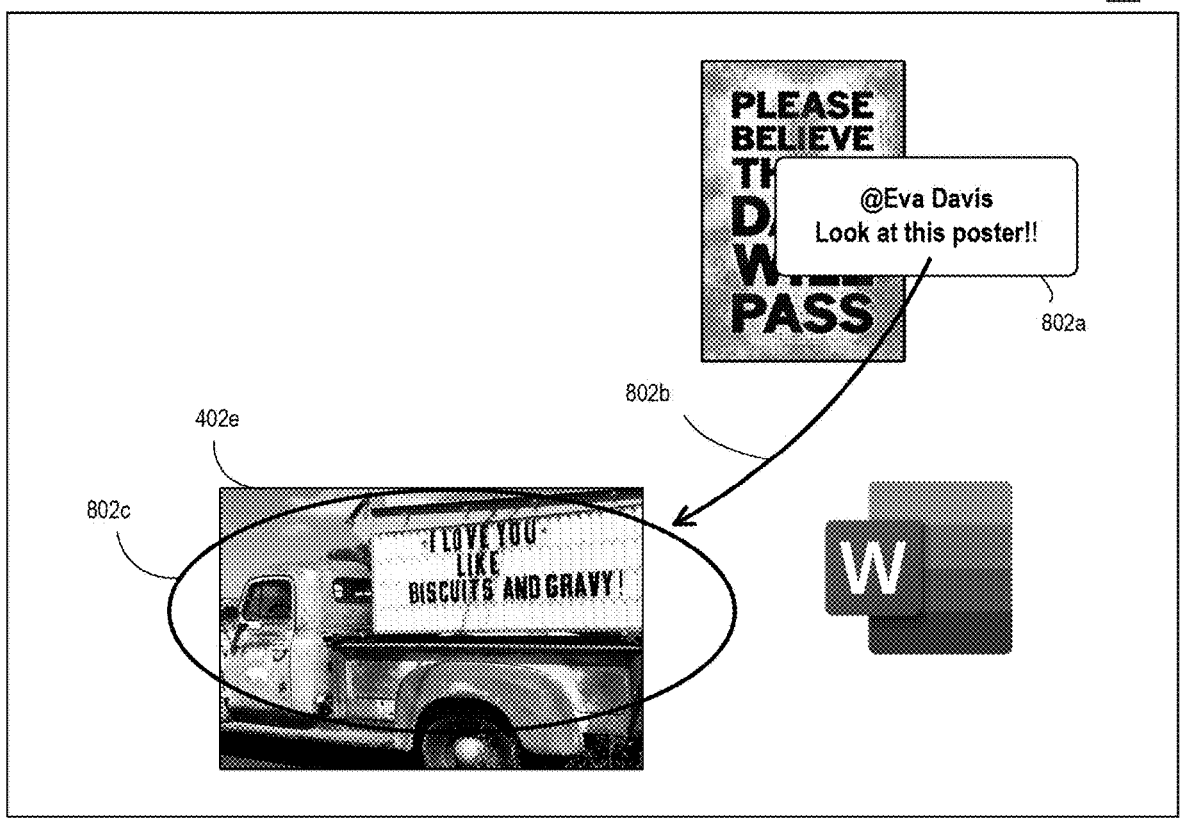
FIG. 8 illustrates exemplary annotations made to a location of an electronic whiteboard corresponding to an integrated unified filing engine, consistent with some embodiments of the present disclosure.
Figure 9:
FIG. 9 illustrates exemplary notifications provided to an entity as a result of actions taken by other entities that are part of the workflow management system, consistent with some embodiments of the present disclosure.

As an illustrative example, FIG. 8 depicts exemplary alterations made to a location 800 of electronic whiteboard 800. In this example, a user has made alterations 802*a* to 802*c* to location 800. Alteration 802*a* may include a digital representation of a "sticky note" or any other textual annotation; alteration 802*b* may include an arrow pointing to an area of location 800; and alteration 802*c* may include an addition of a shape or general highlighting of an area of location 800 which a user wishes to bring attention to. In this example, alteration 802*a* includes the message "@Eva Davis Look at this poster!!" which may cause the at least one processor to tag "Eva Davis" and automatically send her a notification. Following this example, FIG-9 depicts exemplary notifications to an entity following alterations made to file 402*e* (of FIG. 4 and FIG. 8) and annotations made to location 800 of FIG. 8. In this example, the exemplary entity is receiving three notifications: notification 902*a* pertaining to a change in the status of file 402*e* made by author 406*c*; notification 902*b* pertaining to annotations 802*a* to 802*c* made by author 406*c*; and notification 902*c* pertaining to a change in the status of file 402*e* made by author 406*a*.

In some embodiments, the at least one processor may be further configured to receive an alteration to the presented corresponding asset, and wherein the alteration to the presented corresponding asset may cause the presented corresponding asset to be associated with another cluster of the electronic whiteboard. Causing the presented corresponding asset to be associated with another cluster of the electronic whiteboard may involve an entity modifying information or an attribute of the corresponding asset displayed on the network access device so that the presented corresponding asset may become associated with a different cluster of the electronic whiteboard. The alteration may cause the presented corresponding asset to be associated with the cluster it was already associated with and any number of additional clusters. For example, where the presented corresponding asset is a word document with text, a user may alter the word document to add information such as additional names or calendar dates. As a result of this alteration, the system may recognize the additional information to be associated with another cluster of the electronic whiteboard and store this association in a repository. Based on this new association, the system may re-render the clusters of the electronic whiteboard in a manner that may indicate an association between the cluster containing the presented corresponding asset and the another cluster in a manner that may indicate the association, such as through proximity, a color indication, a connected line, or any other indication. For example, an asset which is located in a first cluster grouped by author may receive an alteration from an entity so that it is also associated with a second cluster grouped by a deadline, and may appear on the electronic whiteboard as being in between both clusters, as part of the first cluster, as part of the second cluster, or any other logical location.

For example, the at least one processor may receive an alteration to file 402*a* of FIG. 4, which may cause the corresponding designation of the file 302*a* of FIG. 3 to be associated with cluster 302*b* and may cause the asset designation for file 502*a* to change its location on electronic whiteboard 300 of FIG. 3 or electronic whiteboard 400 of FIG. 4. In other embodiments, file 402*a* may be associated with cluster 302*b* but may remain in its current location on electronic whiteboard 300.

Consistent with some disclosed embodiments, the at least one processor may be further configured to receive an alteration to the presented corresponding asset, and wherein the alteration to the presented corresponding asset may cause a simultaneous change to the at least one table and the at least one electronic whiteboard. Causing a simultaneous change to the at least one table and the electronic whiteboard may involve an entity providing an alteration to an asset, which may cause the at least one processor to transmit the alteration to the at least one table and the electronic whiteboard at the same time. For example, the alteration may involve annotating an asset designation on the electronic whiteboard (e.g., via a note, drawing, emoji, or other comment or illustration), making a change to the metadata, changing anything in the item (e.g., editing text, an entry in excel, an image, video, or other changes to an item), the alteration being carried throughout the system to the at least one table and the at least one electronic whiteboard at the same time. In some embodiments, the alteration may be made to a location or cluster of the electronic whiteboard and not to an asset itself. In other embodiments, following one or more alterations to an asset, the electronic whiteboard may store one or more versions of the asset. Here, an entity may request to view an older version of an asset, to revert an asset back to a previous version, compare versions to each other, track which entity has modified the asset at any time, and any other functionality that relates to editing or comparing one or more versions of an asset.

In some embodiments, the at least one processor may be further configured to receive selections of one or more items for storing on the electronic whiteboard. Items may be uploaded by transmitting data from a system to the workflow management system. An upload may be initiated by an entity using a network access device or automatically by a computerized system. Items may be uploaded via web browsers, FTP clients, terminals (e.g., SCP/SFTP), a cloud, or file sharing. Items may be uploaded by, for example, selecting files through a file explorer, dragging and dropping files into a space such as the electronic whiteboard, sending an email, posting on social media, clicking on a link, adding directly from a website (such as Google Docs, Dropbox, social media, or any other site where files may be stored) or any other suitable method for uploading files. When uploading files, the at least one processor may perform recognition processes on the files. For example, the at least one processor may scan an uploaded image to provide an entity with smart tags for a city the image was taken in (e.g., a smart tag of "New York," if the at least one processor recognizes the Brooklyn Bridge), scan a pdf to allow an entity to sign a document, provide a report on a file, or any other process which allows an entity to edit an item in any way before, during, or after it has been uploaded.

Figure 10:
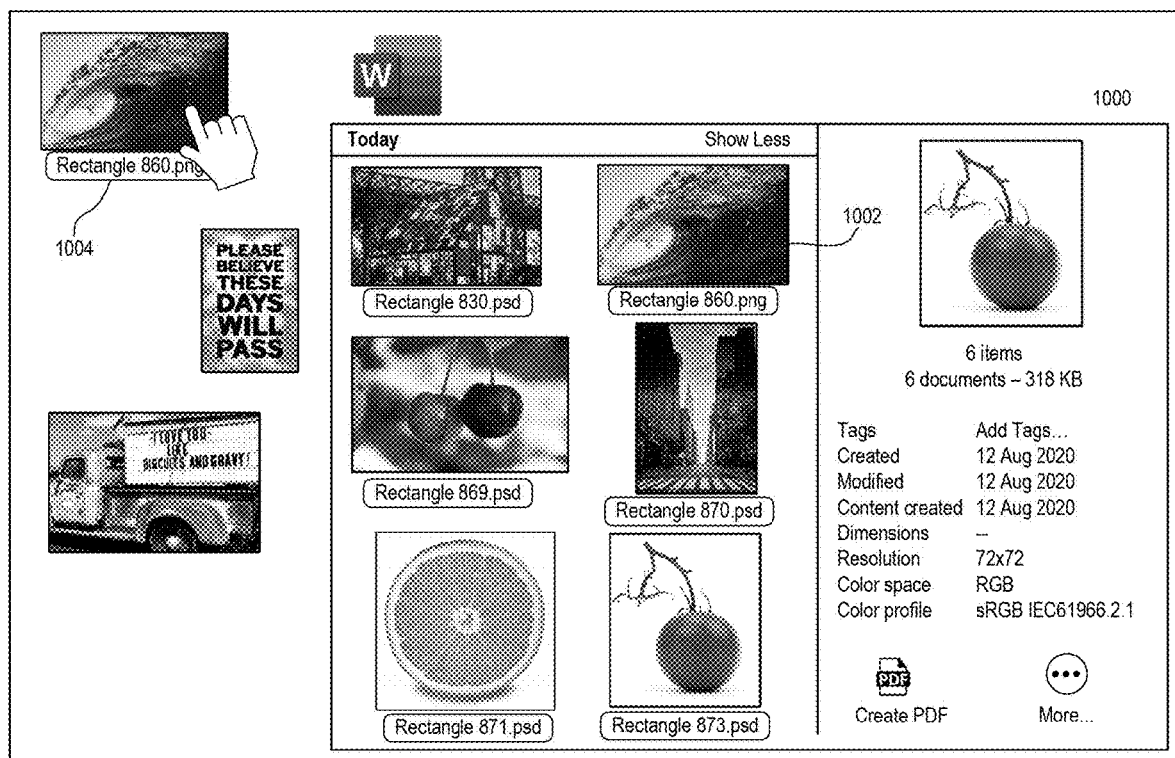
FIG. 10 illustrates an exemplary uploading of a digital file by dragging the digital file to an electronic whiteboard, consistent with some embodiments of the present disclosure.
Figure 11:
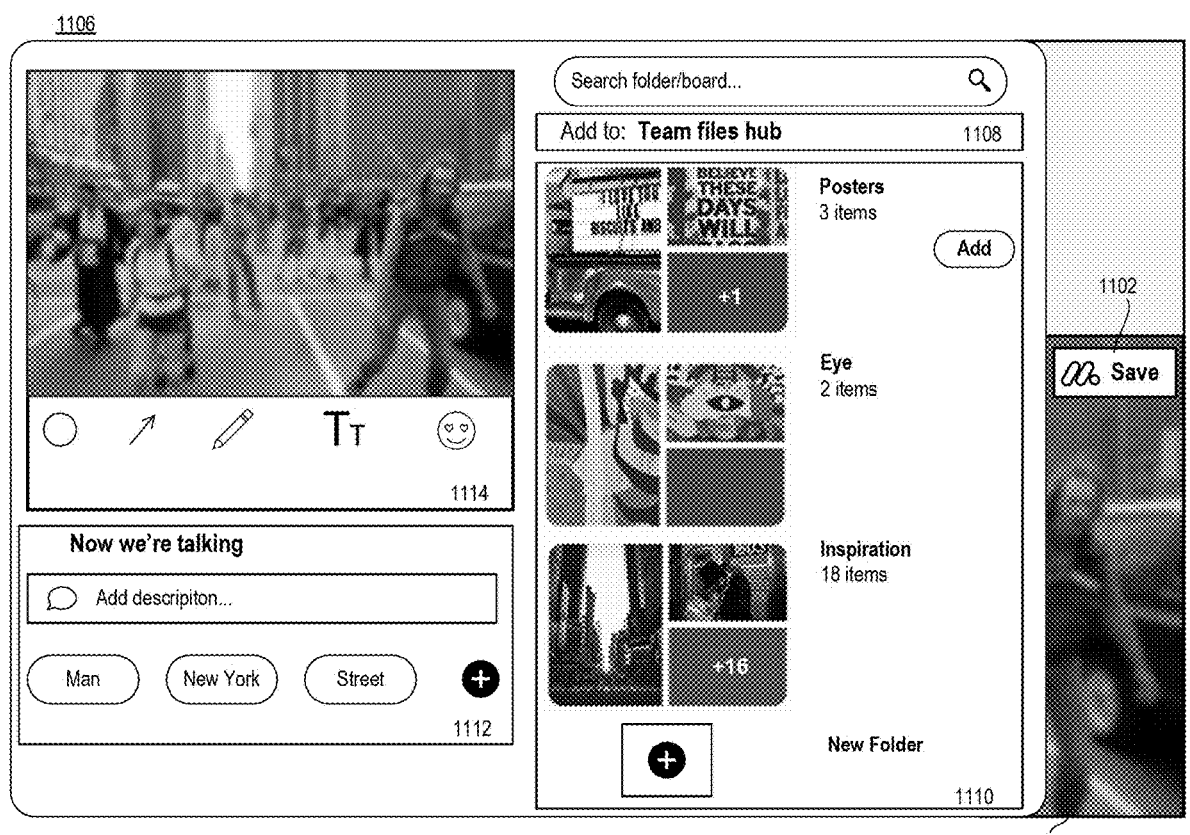
FIG. 11 illustrates an exemplary uploading of a digital file by adding the digital file to an electronic whiteboard from a different platform, consistent with some embodiments of the present disclosure.

By way of example, FIG. 10 depicts an exemplary process for adding files to an electronic whiteboard 300 of FIG. 3. In this example, the at least one processor may receive an indication that a user wishes to add a file to electronic whiteboard 300 by receiving a selection or click to button 304, which may prompt a file explorer 1000 to be presented to the user. Alternatively, the user may simply pull up file explorer 1000 themselves. File explorer 1000 may then be used by the user to add files to electronic whiteboard 300. For example, the user may drag file icon 1004 onto electronic whiteboard 300 to add file icon 1004 and corresponding file 1002 to electronic whiteboard 300. As another example, a file may be added to electronic whiteboard 300 by the method shown in FIG. 11, which depicts an exemplary process for adding files to electronic whiteboard 300. In this example, the at least one processor may overlay a button 1102 on a file 1104 on a website. The at least one processor may receive a selection or click from a user to button 1102 indicating that the user wishes to add file 1104 to an electronic whiteboard. The at least one processor may then provide the user with interface 1106. The user may then utilize interface 1106 to provide details to the at least one processor, for example, through field 1108 the user may indicate which electronic whiteboard to save file 1104 to (i.e., electronic whiteboard 300), through field 1110 the user may indicate which cluster to add file 1104 to, and through fields 1112 and 1114 the user may make alterations or add annotations to file 1104 before adding file 1104 to electronic whiteboard 300.

In some embodiments, the at least one processor may be further configured to receive a request to provide a report on an item. For instance, a report may include how many entities have accessed the item, how long has each entity spent looking at the item, where in the item did each entity scroll or click.

Figure 12:
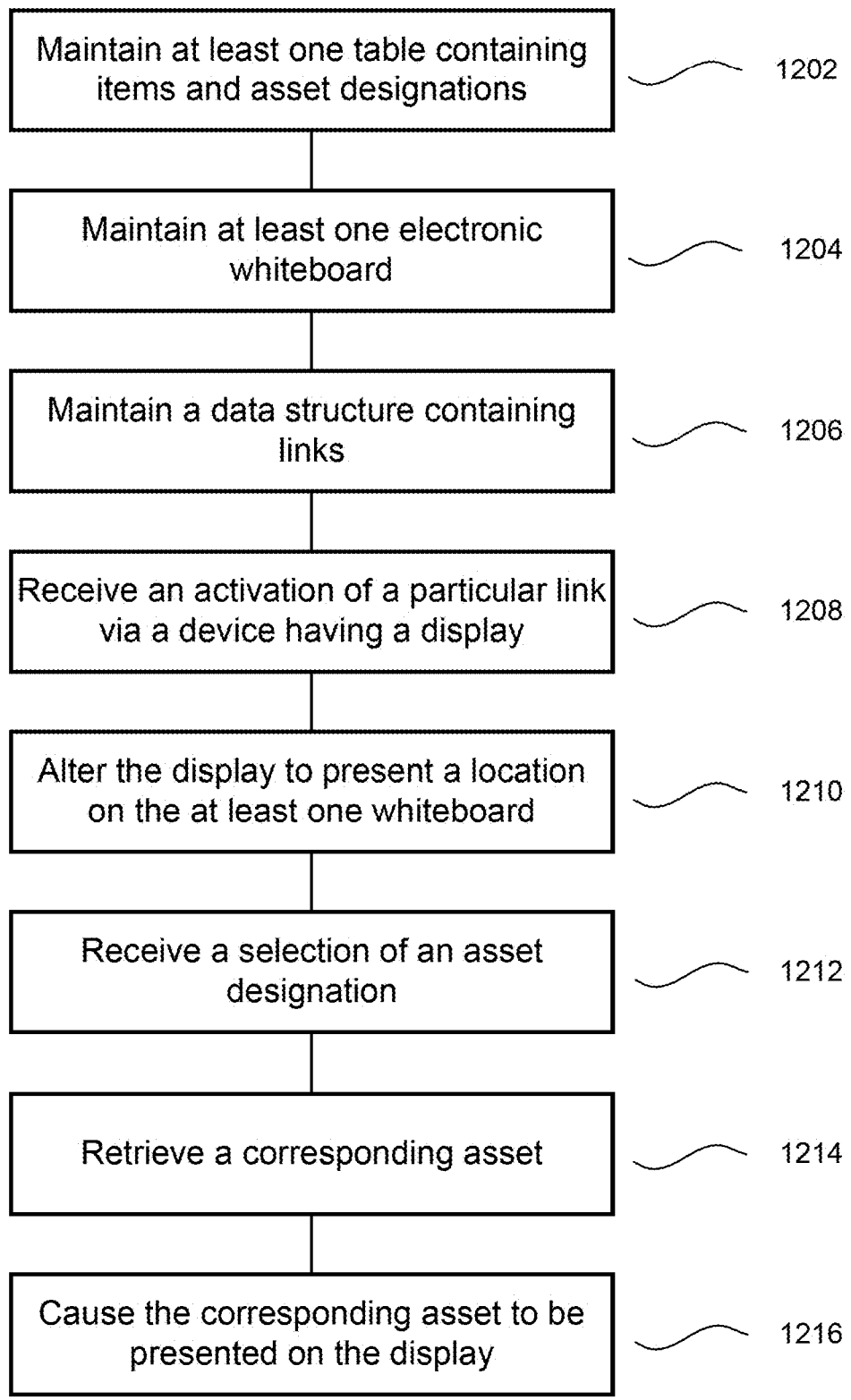
FIG. 12 is a block diagram of an exemplary workflow management system having an integrated unified filing engine, consistent with some embodiments of the present disclosure.

FIG. 12 illustrates an exemplary process block diagram of a workflow management method 1200 having an integrated unified filing engine. The method may be implemented, for example, using a system including a processor, as previously described. To the extent specific details and examples were already discussed previously, they are not repeated with reference to FIG. 12. In this example, at block 1202 the processor may maintain at least one table of a workflow management system, the at least one table containing a plurality of items and a plurality of asset designations, each asset designation being associated with at least one of the plurality of items. At block 1204, the processor may maintain at least one electronic whiteboard containing at least a subset of the asset designations. At block 1206, the processor may maintain a data structure containing a plurality of links, wherein each link associates at least one of the subsets of asset designations with at least one location on the at least one electronic whiteboard. At block 1208, the processor may receive via a network access device having a display presenting the at least one table, an activation of a particular link associated with a particular asset. At block 1210, in response to the activation of the particular link, the processor may alter the display to present at least a particular location on the at least one electronic whiteboard containing a particular asset designation corresponding to the particular asset, wherein the particular location includes a cluster of additional asset designations related to the particular asset. At block 1212, the processor may receive a selection of at least one of the additional asset designations or the particular asset designation. At block 1214, in response to the selection, the processor may retrieve a corresponding asset. At block 1216, the processor may cause the corresponding asset to be presented on the display.

In enterprise messaging systems it may be beneficial to monitor, copy, store, and organize endless possible forms of communication in conjunction with a collaborative work system. Organizing and distributing communications across multiple user accounts can be burdensome when possible, communications may be continuous and ongoing across different platforms and services while shifting in frequency, medium, and subject matter. Additionally, communications may include or surround the exchange of or reference to documents or other work product. In some instances, a single communication may be relevant to multiple endeavors while in other instances a communication using one medium or service may be responsive to a communication received in another. Thus, there is a need for unconventional innovations for helping to ensure that communications are managed consistently and correctly.

Such unconventional approaches may enable computer systems to determine tools and functions that may be implemented to improve efficiency of project management software applications by improving processing times and storing of information contained in project management software applications in memory thereby reducing reliance on external databases. By providing tools and functionality unavailable in traditional messaging systems and platforms, a system may increase the efficiency and operations of workflow management functionality through aggregation, consolidation, and mediation of communications across platforms and subjects.

Aspects of some embodiments of this disclosure may relate to an enterprise messaging system for message mediation and verification. An enterprise messaging system may include a system, service, or other platform that may facilitate the exchange of communications between systems and/or devices. Examples of communications may include, but are not limited to, email, instant messaging (e.g., Slack), or text (e.g., SMS) messages. Message mediation may include matching incompatible protocols, data formats, and interaction patterns in order to match different capabilities across different systems, services, devices, or platforms. Message mediation may include transforming a message from one format to another, allowing reception and transmission of differing message formats. Message mediation may also include routing messages (sent or received) to one or more target destinations. For example, message mediation may direct a received email to an inbox as specified by an email address. Message verification may include establishing truth, accuracy, and/or validity of the source or contents of a message. Message verification may further include ensuring a message is sent, received, copied, or otherwise routed correctly. An enterprise messaging system may perform message mediation and verification using a central processor, a designated processor, one or more processors, or other suitable hardware.

An enterprise messaging system may be integrated with a collaborative work system. Integration may provide access to services or functionality of an enterprise messaging system from within a collaborative work system. For example, integrating an email service with a collaborative work system may allow messages to be sent, received, stored, and viewed using the collaborative work system environment. In further examples, integrating multiple enterprise messaging systems may also aggregation of differing message mediums in a single presentation.

Some disclosed embodiments may include maintaining a plurality of interconnected boards. Maintaining interconnected boards may include one or more boards that may share items, data, ownership, or other connections that may be stored in a repository. For example, a board of a first group may include names and contact information for multiple individuals. A different board may be interconnected to the first group if it includes or references any of the information contained in the first group. In another example, a board of the first group may have an owner or be maintained by a user. A board of the second group may be interconnected with the board of the first group if the board of the second group is maintained by the same user or by a user associated with the user (e.g., both users are members of the same organization or team). In some embodiments, maintaining a plurality of interconnected boards may include storing a form of each board or table, with vertical and/or horizontal row headers defining information to be contained in cells of such rows. Maintaining a plurality of interconnected boards may also include storing values associated with the cells of such rows. In some embodiments, maintaining a board may include one or more of saving, storing, recording, updating, tracking, counting, editing, viewing, displaying, aggregating, combining, or otherwise retaining in a repository information for representation in a board. A "board" or "table" may include those items described previously in connection with the term "tablature," and may include horizontal and vertical rows for presenting, displaying, or enabling access to information stored therein. A board or table may be presented on a screen associated with a computing device or any electronic device that displays or projects information on a surface or virtually as described previously above. An intersection of multiple rows (e.g., a horizontal row and a vertical row) may represent a cell. A cell may contain values, text, colors, graphics, symbols, gifs, memes, any combination thereof, or any other data.

In some embodiments a first group of at least some of the plurality of interconnected boards may include items that contain external contact addresses. For example, one or more boards may include an item or cell indicating or referencing (e.g., a hyperlink) an external contact address associated with a user or contact for routing communications to a specified destination (e.g., to an entity, to a device, to a physical address). An external contact address may include any combination of text, numbers, or symbols that can be used to identify a specific destination or user outside or independent of the interconnected boards such as but not limited to an email address, a phone number, a username, a mailing address, or an IP address.

In some embodiments a second group of at least some of the plurality of interconnected boards may omit external contact addresses. Some boards may include a reference to a user or contact without including the item or cell indicating or referencing an external contact address. In some instances, some boards may lack any associations to any external contact addresses in general. For example, where one or more boards associate an external contact address with a contact, other boards may refer to the contact without listing the external contact address. However, the contact remains associated with the external contact address even in a board where the external contact address is omitted due to the interconnection between the first group of boards (with an external contact address) and the second group of boards (which omit the external contact address). This may decrease or eliminate the need to duplicate external contact addresses across multiple boards, thus simplifying a network of boards and eliminating potential errors associated with manual or automatic reproduction of data.

For discussion purposes, FIG. 14 illustrates a plurality of exemplary interconnected boards 1400, 1425, and 1450. Board 1400 may be included in a first group of the plurality of interconnected boards as a board 1400 including email addresses 1404 in a vertical row or column under email address heading 1404. Board 1425 and board 1450 may be included in a second group of the plurality of interconnected boards because they do not include an email address.

Some disclosed embodiments may include monitoring, via a mediator overlay on an enterprise messaging system, contact addresses of incoming messages. An enterprise messaging system may include a processor, module, set of rules, process, or any defined software or hardware serving as a mediator overlay which formats and/or routes messages as described above. A mediator overlay may monitor communications or messages as they are sent to a destination (e.g., a mailbox or a board) within an enterprise messaging system. Monitoring contact addresses of incoming messages may include performing a lookup of author or recipient fields of a communications to make a determination of a contact address in an incoming message. The mediator overlay may monitor or identify a contact address of an incoming message. For example, a mediator overlay may identify an email address associated with a recipient of the incoming message. A mediator overlay may include a webhook, web callback, HTTP push API, or any other method that may provide information or data from other applications in real-time. For example, a mediator overlay may be linked or associated with an email inbox such that when a message is received by the inbox, the message or information associated with the message may also be delivered to or readable by the mediator overlay.

Some embodiments may include comparing a contact address of a specific incoming message against a repository of addresses associated with a first group of at least some of a plurality of interconnected boards. Contact addresses associated with one or more boards (as part of the first group) may be stored in a repository, as disclosed previously. Individual contact addresses may be associated with a user, a contact, a board, or any other item or cell. When a mediator overlay identifies a contact address associated with a message, the contact address of that message may be compared against contact addresses stored in the repository. A contact address of each message may be compared, multiple contact addresses associated with the specific message may be compared, or no contact addresses associated with the specific message may be compared, according to system rules reflecting desired functionality or security settings.

In some embodiments, in response to a match between a specific contact address of an incoming message and at least one address contained in a repository, the at least one processor may generate at least one primary duplicate message of the specific incoming message. A duplicate message may include a copy or other replication of a message. Generating a duplicate message may include copying, duplicating, or replicating all properties and details of the original message such as metadata, hyperlinks, and formatting as well as coping, duplicating, or replicating attachments associated with the message. The duplicate message may be stored in a repository. The at least one primary duplicate message may be associated with each board of the first group of at least some of the plurality of interconnected boards. Each board of the first group of the interconnected boards may contain or be associated with the matching contact address, as described above. For example, when the contact address associated with an incoming message matches a contact address associated with a board, then that incoming message may be duplicated, stored, or otherwise associated with that board. In some embodiments, the incoming message may be duplicated once, and the duplicate may be associated with one or more boards each containing the matching external contact address. In other embodiments, a separate duplicate of the incoming message may be generated, stored, and associated with each board in the first group of interconnected boards containing the matching external contact address.

A "primary," "secondary," "tertiary," "quaternary," and so forth duplicate may refer to a distinction between instances that duplicates may be generated via links between interconnected boards. In some embodiments, they may refer to a chronological order in which a duplicate or copy is generated. In further embodiments, a "primary," "secondary," "tertiary," "quaternary," and so forth duplicate may refer to a hierarchical copy of a message, reflecting the degree of separation between the first group (i.e., primary)

of at least some of a plurality of interconnected boards which include external contact addresses and the delineated (i.e., secondary, tertiary, quaternary, and so forth) group of the at least some of the plurality of interconnected boards.

In some embodiments, an administrator or user may prevent or block a generation of duplicate messages based on preference or security settings. For example, a blacklist may be generated which may include external contact addresses such as email addresses or domain names. If the specific contact address of an incoming message matches an external contact address on the blacklist, then a duplicate message will not be generated.

Some disclosed embodiments may further include determining for each of the boards of the first group having at least one primary duplicate message associated therewith at least one linked board of the second group. Due to the interconnectivity between boards, a board of the first group may be linked to one or more boards in the second group. A link between one or more boards may include any connection, overlap, or association between data contained in or associated with a board of the first group and one or more boards of the second group such as but not limited to a shared item, common board ownership, or a common domain name associated with users associated with the one or more boards. Determining at least one linked board of the second group for each of the boards of the first group having at least one primary duplicated message may include the system carrying out an analysis of links between boards of the first and second groups to determine at least one linked board of the second group based on one or more of the links. In one example, a link between one or more boards of the first group and one or more boards of the second group may include a shared item or data included in both a horizontal or vertical row in the one or more boards of the first group and in a horizontal or vertical row in the second group of boards. A link between a board of the first group having at least one primary duplicate message associated therewith and a board of the second group may be determined by comparing data associated with the board of the first group or items contained within the board of the first group with data associated with boards of the second group or items contained with the boards of the second group. A link may be determined when data associated with the board of the first group or items contained within the board of the first group matches or overlaps with data associated with boards of the second group or items contained with the boards of the second group. Multiple links may be determined between a board of the first group and a board in the second group. Additionally or alternatively, links between a board of the first group and multiple boards in the second group may be determined. Links between a board of the first group and multiple boards in the second group may be based on the same or different matching or overlapping data (e.g., the link between the board of the first group and a first board of the second group may be based on both boards having the same owner while the link between the board of the first group and a second board of the second group may be based on the same item appearing in both boards). For example, a board in the first group may identify a specific user associated with the external contact address by a first name, surname, username, title, picture, or any other identifier as discussed previously. A board in the second group may be linked to the board of the first group by including the identifier associated with the specific user without including the external contact address associated with the specific user.

Referring to FIG. 14, a link between board 1400 of a first group and board 1425 of a second group may be determined based on the inclusion of names 1402 from board 1400 as individuals assigned 1428 to a task 1426 in board 1425.

As another example, a board in the first group may be owned or generated by a user associated with an email address indicating a domain name. A board in the second group may be linked with the board in the first group because it is owned or generated by the same user. Additionally or alternatively, in this example, the board in the second group may be linked with the board in the first group because a user associated with the board in the second group may be associated with the same domain name as the user associated with the board in the second group (e.g., the email addresses associated with both users share a domain name).

Some embodiments may include generating for the at least one linked board of the second group at least one secondary duplicate message of the specific incoming message. Generating a secondary duplicate message may include generating an additional copy or other replication of the incoming message in addition to a first, previous, or primary duplicate of the incoming message. Additionally or alternatively, a secondary duplicate may be generated by copying, duplicating, or replicating a primary duplicate message of the incoming message. The secondary duplicate message may be stored in a repository. The system may associate the at least one secondary duplicate message with the at least one linked board of the second group. For example, when a message is received and a primary duplicate message may be generated, then a secondary duplicate message may be generated based on the link between the board of the first group and the board of the second group. In some embodiments, the message (incoming or outgoing) may be duplicated once, and the duplicate may be associated with one or more boards of the second group. In other embodiments, a separate duplicate of the message (incoming or outgoing) may be generated, stored, and associated with each board in the second group of interconnected boards.

Some disclosed embodiments may include determining for each of the boards of a second group having at least one secondary duplicate message associated therewith at least one linked board of a third group of at least some of the plurality of interconnected boards. Interconnected boards may facilitate multiple links between a board or group of boards which may be further interconnected with additional boards or groups of boards. A link between one or more boards may include any connection, overlap, or association between data associated with a board of the second group and one or more boards of a third group, as previously discussed above. A link may be determined when data associated with the board of the third group or items contained within the board of the third group matches or overlaps with data associated with boards of the second group or items contained with the boards of the second group. A link between the board of the third group and the board of the second group may be based on matching the same type or field of data that is the basis for the link between the board of the second group and the board of the first group. Additionally or alternatively, a link between the board of the third group and the board of the second group may be based on matching a different type or field of data that may be the basis for the link between the board of the second group and the board of the first group.

For example, data such as an external contact address, first name, surname, username, title, picture or graphical data, company, or other information as disclosed previously may be associated with a board in the first group. A link between a board in the second group and the board in the first group may be determined based on matching data associated with the specific user with data associated with the board of the second group (e.g., username) wherein the data associated with the board of the second group does not include the external contact address associated with the specific user.

Figure 13:
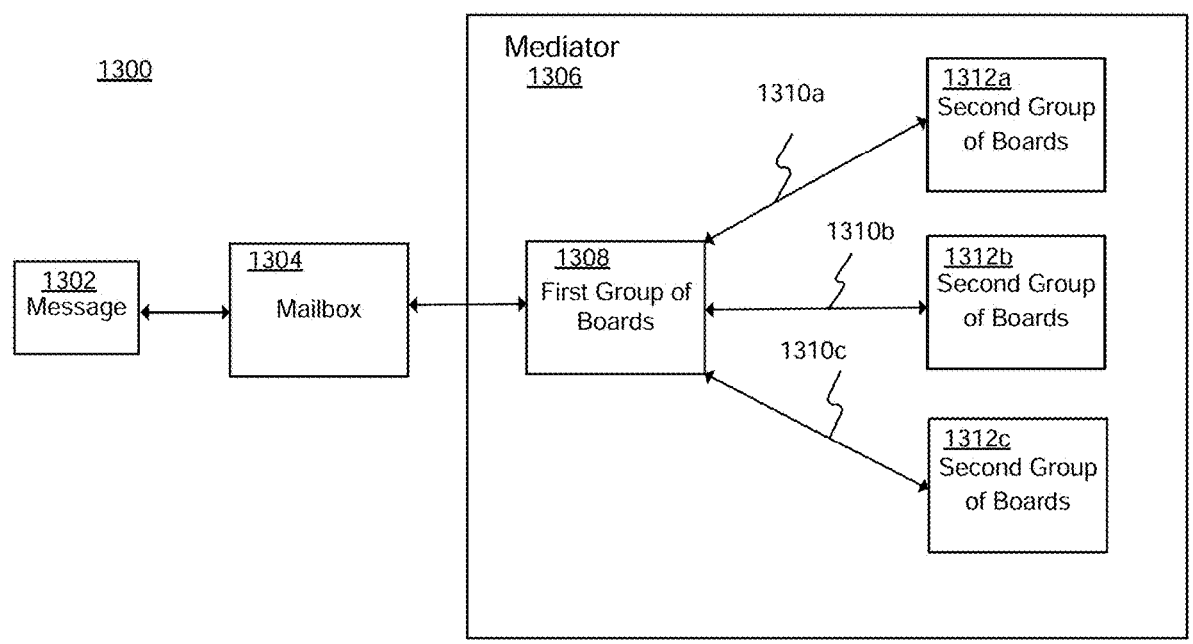
FIG. 13 depicts a block diagram of an exemplary enterprise messaging system, consistent with some embodiments of the present disclosure.

Referring to FIG. 13 and FIG. 14, board 1400 may be included in a first group of boards 1308 because an email address 1404 (e.g., external email address) is associated with an item in board 1400. Board 1425 and board 1450 of FIG. 14 may be included in a second group of boards 1312a (FIG. 13) because they do not contain (e.g., omit) an email address or any other external contact address. Mediator 1306 of FIG. 13 may monitor mailbox 13054 and determine an email address 1404 (of FIG. 14) associated with incoming message 1304. A duplicate message of message 1302 may be generated and associated with board 1400. A link 1310a may be determined between board (e.g., board 1425 of FIG. 14) from a second group of boards 1312a and board (e.g., board 1400 of FIG. 14) from a first group of boards 1308 based on a determination of a link based on a shared "Ralph" item 1402a in board 1400 and item 1428a associated with Ralph in board 1425. Based on a link 1310, another duplicate message of message 1302 may be generated and associated with board 1425. A link may be determined between board 1450 from a third group of boards (not shown) and board 1425 from the second group of boards 1312a based on the shared "Task #4" item 1426d in board 1425 and item 1452a in board 1450. Based on the link between board 1425 and board 1450, a further duplicate message of message 1302 may be generated and associated with board 1450.

In an alternative example, link 1310b may be determined between board 1450 from a second group of boards 1312b and board 1400 from a first group of boards 1308 based on common board ownership (not shown) of board 1400 and board 1450. For example, a user (Sam) 1402c associated with an external contact address 1404c may have generated and thus, own board 1450. When a contact address associated with an incoming message 1302 includes "sam@email.com," then a primary duplicate of message 1302 may be generated and associated with board 1400 based on the match between the contact address associated with an incoming message 1302 and the email address 1404c in a repository. A secondary duplicate of message 1302 may be generated and associated with board 1450 based on the link between the owner of board 1450 in the second group of boards 1312b and the email address 1404c in board 1400 from the first group of boards 1308.

Some disclosed embodiments may include generating for the at least one linked board of the third group at least one tertiary duplicate message of the specific incoming message. For example, when the contact address associated with an incoming message matches a contact address associated with a board of the first group which may be linked to a board of the second group, which may also be linked to a board of the third group, then that incoming message may be duplicated, stored, and associated with a board of the third group. In some embodiments, the incoming or outgoing message may be duplicated once, and the duplicate may be associated with one or more boards of the third group. In other embodiments, a separate duplicate of the incoming or outgoing message may be generated, stored, and associated with each board in the third group of interconnected boards. The tertiary duplicate message may be stored in a repository such that the system may associate the at least one tertiary duplicate message with the at least one linked board of the third group, similar to the discussion regarding the secondary message above.

Some disclosed embodiments may include monitoring, via a mediator overlay, contact addresses of outgoing messages. A mediator overlay, as described previously above, may monitor communications or messages as they are sent using an enterprise messaging system. Outgoing messages may include any communications sent from the system to a third-party system. Additionally or alternatively, for messages originating from within the enterprise messaging system, the mediator overlay may determine, identify, and monitor a contact address associated with an outgoing message based on information available within the enterprise messaging system (e.g., via a composer or the outgoing message or outbox). For example, a mediator overlay may be linked or associated with a messaging account such that when a message is sent using the enterprise messaging system, the message or information associated with the message may be stored based on the mediator monitoring or identifying a contact address associated with an outgoing message. For instance, a mediator overlay may identify an email address associated with a recipient or an author of the outgoing message.

Some disclosed embodiments may include comparing a contact address of a specific outgoing message against a repository of addresses associated with a first group of at least some of a plurality of interconnected boards. Contact addresses associated with one or more boards may be stored in a repository, as discussed previously. Individual contact addresses may be associated with a user, a contact, a board, or any other item or cell. When a mediator overlay identifies a contact address associated an outgoing message, the contact address of that message may be compared against contact addresses stored in the repository.

Some disclosed embodiments may include, in response to a match between the contact address of the specific outgoing message and at least one address contained in the repository, generating at least one primary duplicate message of the specific outgoing message. Generating a duplicate message may include a copy or other replication of a message, as described previously above. Generating a duplicate message may include copying, duplicating, or replicating all properties and details of the original message such as metadata, hyperlinks, and formatting as well as coping, duplicating, or replicating attachments associated with the message, as described previously. The duplicate message may be stored in a repository and the system may associate the at least one primary duplicate message of the specific outgoing message with each board of the first group of at least some of the plurality of interconnected boards. For example, when the contact address associated with an outgoing message matches a contact address associated with a board, then that outgoing message may be duplicated, stored, and associated with that board. In some embodiments, the outgoing message may be duplicated once, and the duplicate may be associated with one or more boards each containing the matching external contact address. In other embodiments, a separate duplicate of the outgoing message may be generated, stored, and associated with each board in the first group of interconnected boards containing the matching external contact address.

Some disclosed embodiments may include determining for each of the boards of the first group having the at least one primary duplicate message of the specific outgoing message associated therewith at least one linked board of the second group. As previously discussed, interconnected boards may facilitate multiple links between a board or group of boards which may be further interconnected with additional boards or groups of boards. The system may similarly determine at least one linked board of the second group as previously discussed.

Referring to FIG. 13 and FIG. 14, board 1400 may be included in a first group of boards 1308 because an email address 1404 (e.g., external email address) is included an item in board 1400. Board 1425 and board 1450 may be included in a second group of boards 1312c because they do not contain an email address. Mediator 1306 may monitor messages originating in or sent from board 1400 in the first group of boards 1308 and determine an email address 1404 associated with outgoing message 1304. A duplicate message of message 1302 may be generated and associated with board 1400. A link 1310c may be determined between board 1425 from a second group of boards 1312c and board 1400 from a first group of boards 1308 based on the shared "Jordan" item 1402d in board 1400 and item 1428d in board 1425. Based on link 1310c, another duplicate message of message 1302 may be generated and associated with board 1425. A link may be determined between board 1450 from a third group of boards (not shown) and board 1425 from the second group of boards 1312c based on the shared "Task #4" item 1426d in board 1425 and item 1452a in board 1450. Based on the link between board 1425 and board 1450, a further duplicate message of message 1302 may be generated and associated with board 1450.

Some disclosed embodiments may include generating for the at least one linked board of the second group at least one secondary duplicate message of the specific outgoing message. Generating a secondary duplicate message may include generating an additional copy or other replication of the outgoing message in addition to a first, previous, or primary duplicate of the outgoing message. Additionally or alternatively, a secondary duplicate may be generated by copying, duplicating, or replicating a primary duplicate message of the outgoing message. The secondary duplicate message may be stored in a repository and the system may associate the at least one secondary duplicate of the outgoing message with at least one linked board of the second group as disclosed previously.

Some disclosed embodiments may include aggregating associated messages of at least one board of the first group in chronological order. Aggregating may include collecting, searching for, or otherwise locating and associating messages that are associated with a board with other messages that are also associated with the same board. Aggregated messages may be arranged in chronological order according to a timestamp associated with the message. A timestamp may be included with metadata associated with a message or generated by the enterprise messaging system upon receiving or sending the message.

Some disclosed embodiments may include, in response to an input, render a presentation of the aggregated associated messages. An input for rendering a presentation of the aggregated associated messages may include any input received from any interface (such as through an interaction via mouse, voice, touchscreen, or keyboard) which indicates an intent to display the associated aggregated messages on any display (e.g., a monitor, projector, AR/VR lens), as described previously above. Additionally or alternatively, the system may render a presentation of the associated aggregated messages in response to a trigger, such as when a new message is received and associated with the current board being presented. Rendering a presentation may include displaying, as part of a graphical user interface, a representation of aggregated messages such as a timeline, news feed, or notification center. The presentation may include all aggregated associated messages or a subset of the aggregated associated messages (e.g., messages from the last seven days or a certain number of messages) and, in response to further input, the presentation may include an additional or expanded subset or all of the aggregated associated messages. The presentation may represent individual messages using graphics, text, or a combination thereof. The presentation may include information about individual messages such as a subject, identity of a sender, identity of a recipient, a time received, content of the message, and any attachments associated with the individual message or group of messages. The presentation of the aggregated associated messages may display all available information associated with individual messages or require it may include a subset of the available information and, in response to further input, render a presentation of additional information.

In some embodiments, the system may filter the aggregated associated messages by at least one of an author, recipient, board owner, date, communication type, communication content, or board address. Filtering may include sorting, excluding, identifying (e.g., altering the presentation of aggregated associated messages associated with a specified aspect), or otherwise altering the display or arrangement of the aggregated associated messages based on a specified aspect. An author may include any entity (e.g., an account associated with an individual, team, company, or other entity) that may have generated and sent a message. A recipient may include any entity that may be intended to receive a message from an author. A board owner may include any entity that may be associated with a board and has administrative rights over the board. A date may include any metric of a day associated with a calendar, such as Gregorian or lunar calendar. A communication type may include a characteristic of a communication. In non-limiting examples, communication types may include audio, video, text, file attachments, email, instant message, or any combination thereof. Communication content may refer to the information contained within a communication that may include any information associated with varying communication types. A board address may include any indication of a destination that may lead to a particular board, such as a board identification number, an IP address, a URL, or any other address that may be associated with a board.

In some embodiments, the presentation may include additional items associated with a board. Items associated with a board may include attachments to messages associated with the board such as documents, spreadsheets, presentations, or photos. Additionally, items associated with a board may include messages sent using a separate enterprise messaging system or messaging platform. The items may be included in the presentation in addition to a relevant message or in the place of message. An item may be included in the presentation instead of an associated message if the body of the associated message is irrelevant such as where the message lacks content (e.g., an empty message body), where the message body is a form message or automatically generate content, or where the message simply refers to the item or attachment (e.g., "see attached").

In some embodiments, the system may add a quote or a quotation to the aggregated associated messaged in chronological order. In one example, an item may include a quote or invoice generated from within board and sent to an external email address. The quote may be included as the content (e.g., body) of a message or as an attachment and sent to an external email address. The presentation of aggregated associated messages may include the quote according to association of the quote with an individual message or may include the quote as an individual item and arrange the quote in chronological order with the messages based on a timestamp. The timestamp associated with the quote may refer to the time the quote was originally generated, the time the quote was last updated, the time the quote was sent (e.g., the timestamp of the message associated with the item), or a time from within the body of the quote such as a due date. In some embodiments, excerpts (keywords, summaries, etc.) from the board, such as, for example, messages or attachments from within the board.

Referring to FIG. 15, timeline 1500 is an exemplary presentation of messages and items associated with board 1425. In FIG. 15, each horizontal row represents a different message or item associated with board 1425. Messages and items are referred to by a subject 1502 associated with the message or item. The presentation also includes a recipient (s) 1504 of each message or item and an author 1506 of each message or item. Additionally, the exemplary presentation includes a date 1508 associated with each message or item. Here, the messages and items are presented in chronological order based on the date 1508, with the oldest message or item presented at the top and the most recently received message or item presented at the bottom. In an alternate embodiment, the most recently received message or item may be presented at the top, with the oldest message or item presented at the bottom. Presentation 1500 includes a quote item 1510. Quote 1510 may represent a message, an attachment to message such as a document, or both.

Figure 16:
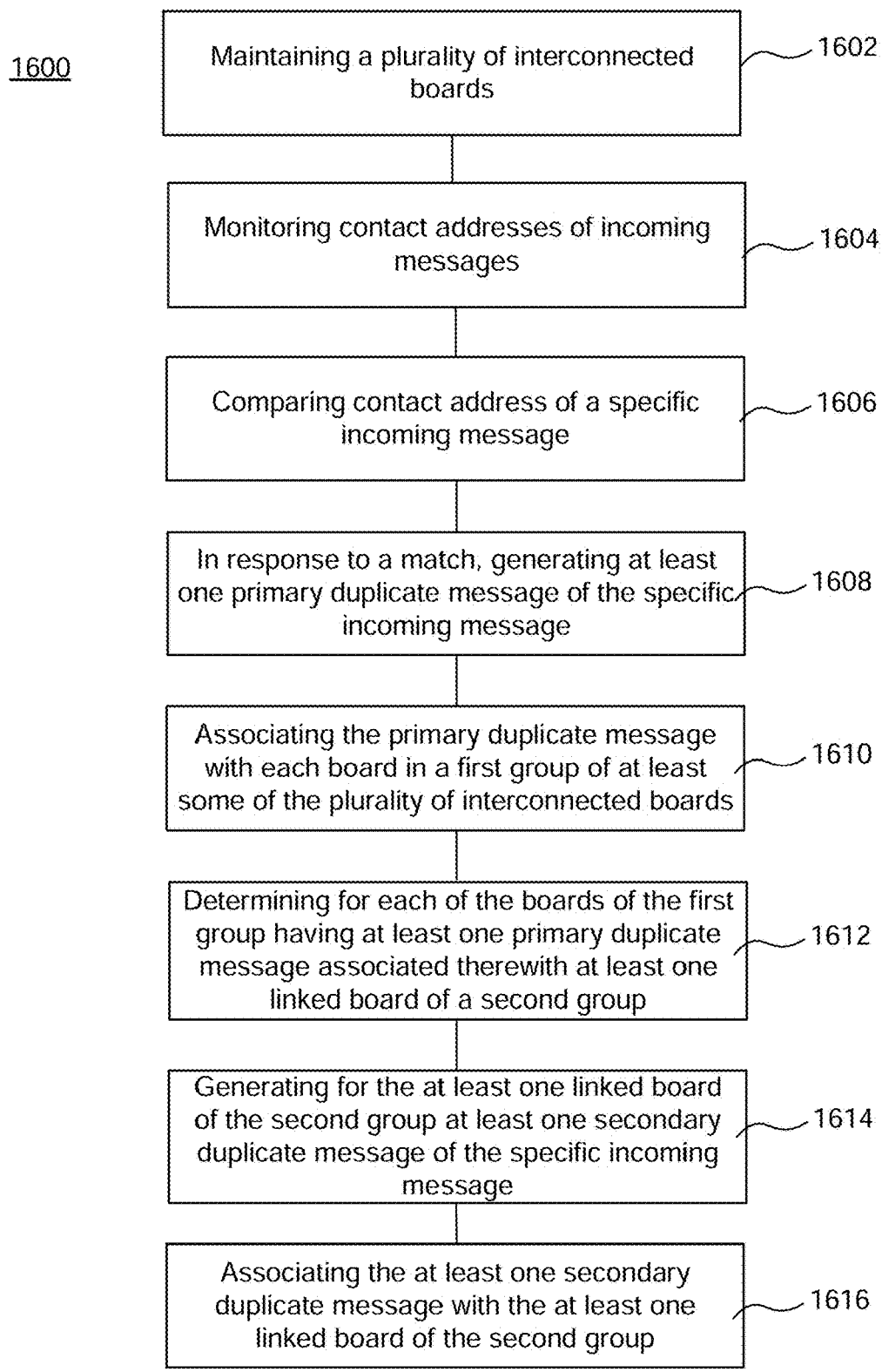
FIG. 16 illustrates a block diagram of an example process for message mediation and verification, consistent with some embodiments of the present disclosure.

FIG. 16 is a block diagram illustrating an example process 1600 for message mediation and verification. Process 1600 may be performed by one or more processors. In some embodiments, a non-transitory computer readable medium may contain instructions that when executed by a processor cause the processor to perform process 1600. Process 1600 is not necessarily limited to the process blocks shown in FIG. 16 and any steps or processes of the various embodiments described throughout the present disclosure may be included in process 1600.

At block 1602, process 1600 may include maintaining a plurality of interconnected boards, consistent with some embodiments as described above.

At block 1604, process 1600 may include monitoring contact addresses of incoming messages, as previously discussed above.

At block 1606, process 1600 may include comparing a contact address of a specific incoming message against a repository of addresses associated with the first group of at least some of the plurality of interconnected boards, as previously discussed.

At block 1608, process 1600 may include, in response to a match between a specific contact address of an incoming message and at least one address contained in a repository, generating at least one primary duplicate message of the specific incoming message, as previously discussed.

At block 1610, process 1600 may include associating the primary duplicate message with each board in a first group of at least some of the plurality of interconnected boards, as previously discussed.

At block 1612, process 1600 may include determining for each of the boards of the first group having at least one primary duplicate message associated therewith at least one linked board of a second group, as previously discussed.

At block 1614, process 1600 may include generating for the at least one linked board of the second group at least one secondary duplicate message of the specific incoming message, as previously discussed above. Generating a secondary duplicate message may include generating an additional copy or other replication of the incoming message in addition to a first, previous, or primary duplicate of the incoming message. Additionally or alternatively, a secondary duplicate may be generated by copying, duplicating, or replicating a primary duplicate message of the incoming message. The secondary duplicate message may be stored in a repository.

At block 1616, process 1600 may include associating the at least one secondary duplicate message with the at least one linked board of the second group, as previously discussed.

As previously discussed, there is an unmet need for ensuring that all entities which should receive a communication are included in a recipient field of a communication in collaborative work environments. Some embodiments of the present disclosure provide unconventional ways of ensuring such inclusion, using an integrated enterprise messaging system that auto-populates recipient fields based on context of source content. Conventional approaches tend to be overly reliant on users remembering who the intended recipients of a communication are, which leaves room for error.

As a result, there is a need for unconventional approaches to auto-populate recipient fields based on the context of source content through some techniques disclosed involving a plurality of boards related to a common entity, receiving an indication of an intent to send a communication, rendering a communication interface, performing a look up of a subset of the plurality of boards, retrieving external addresses from the subset, populating the communication interface with the retrieved external addresses, causing the communication to be transmitted, and linking the transmitted communication to at least one board of the plurality of boards.

Aspects of some embodiments of this disclosure may provide a technical solution to the challenging technical problem of online communications and may relate to an enterprise messaging system for auto-populating recipient fields based on context of source content, the enterprise messaging system having at least one processor, such as the various processors, processing circuitry, or other processing structure described herein. Such solutions may be employed in collaborative work systems, including methods, systems, devices, and computer-readable media. For ease of discussion, references below to systems, methods, or computer readable media apply equally to all. For example, the discussion of functionality provided in a system is to be considered a disclosure of the same or similar functionality in a method or computer readable media. For example, some aspects may be implemented by a computing device or software running thereon. The computing device may include at least one processor (e.g., a CPU, GPU, DSP, FPGA, ASIC, or any circuitry for performing logical operations on input data), as discussed previously, to perform example operations and methods. Other aspects of such methods may be implemented over a network (e.g., a wired network, a wireless network, or both).

As another example, some aspects may be implemented as operations or program codes in a non-transitory computer-readable medium. The operations or program codes may be executed by at least one processor. Non-transitory computer readable media may be implemented as any combination of hardware, firmware, software, or any medium capable of storing data that is readable by any computing device with a processor for performing methods or operations represented by the stored data. in a broadest sense, the example methods are not limited to particular physical or electronic instrumentalities but rather may be accomplished using many different instrumentalities.

Aspects of some embodiments of this disclosure may be related to enterprise messaging, which may refer to a set of standards extending throughout one or more entities (e.g., businesses, companies, universities, or any other organizations) that may enable the one or more entities to send communications between computer systems. Auto-populating may refer to the at least one processor adding data to a previously empty or incomplete section of a communication, form, document, webpage, graph, or any other appropriate interface. Auto-populating may occur automatically, following a determination by the at least one processor, or following the reception of an input. A recipient field may refer to a particular area associated with a communication interface which may contain one or more identifiers related to one or more entities which are on the receiving end of a communication. A context of source content may refer to the objects or entities surrounding or associated with a piece of data which may be used by the at least one processor to make a determination including, for example, subject matter of the source content, key words in the source content, and so on. For example, where a piece of data may include an email address under a column heading of "co-worker contact," the system may infer that all of the email addresses contained in that column pertains to co-workers in relation to the owner or author of the board containing that column. In another example, the context may be inferred from other parts of the board such as other columns that may include telephone numbers. Based on the telephone numbers, the system may infer that the area codes associated with those telephone numbers are associated with a geographical area and also infer geographical information from the telephone numbers in relation to external contact information in another column of a board.

Figure 17:
FIG. 17 illustrates an exemplary board containing differing external addresses, consistent with some embodiments of the present disclosure.
Figure 18:
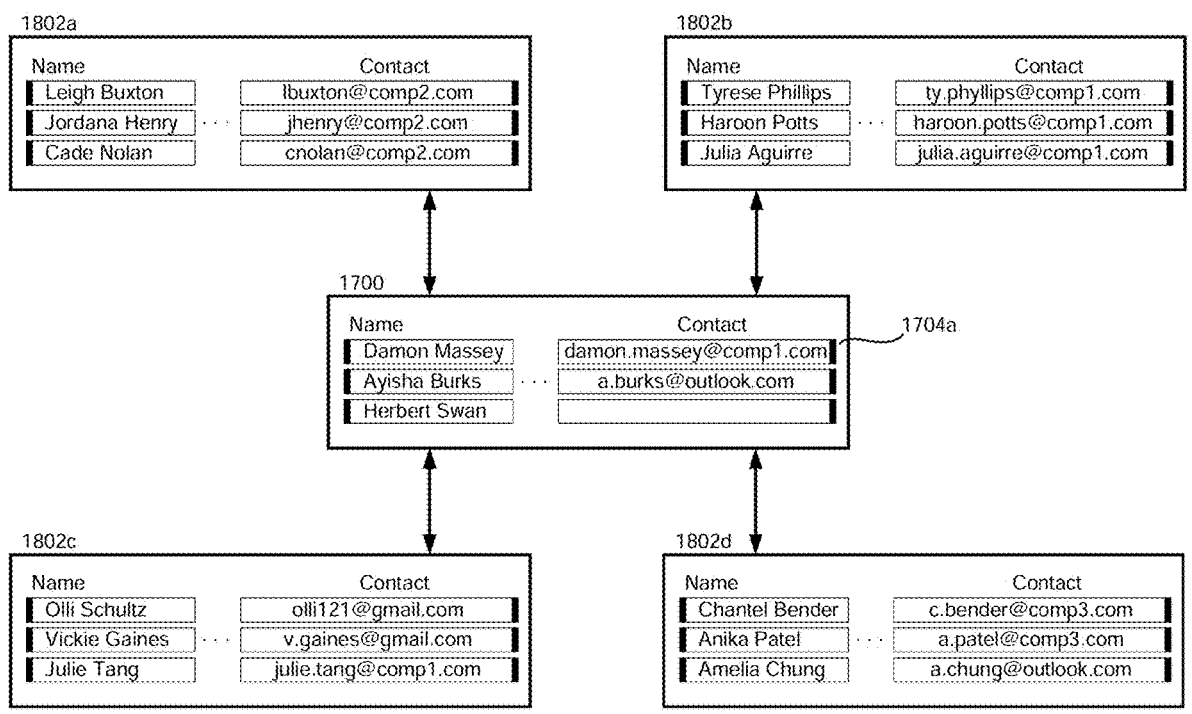
FIG. 18 illustrates a plurality of exemplary boards containing differing external addresses, consistent with some embodiments of the present disclosure.
Figure 19:
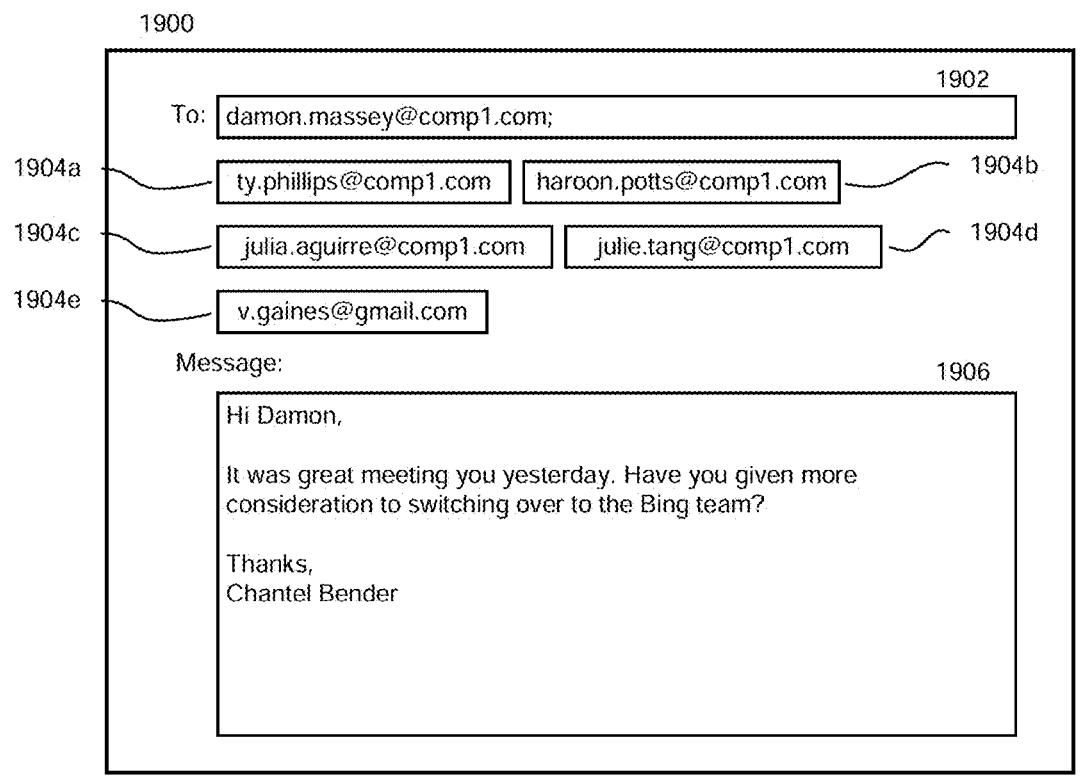
FIG. 19 illustrates an exemplary communication interface, consistent with some embodiments of the present disclosure.

By way of example, an enterprise messaging system may involve utilizing a board 1700 of FIG. 17 and related boards 1802a to 1802d of FIG. 18 to populate one or more recipient fields of a communication interface such as recipient field 1902 of communication interface 1900 of FIG. 19.

Some disclosed embodiments may involve maintaining a plurality of boards related to a common entity, wherein each board of the plurality of boards includes differing external addresses. A board in some instances may refer to an arrangement of data presented, for example, in horizontal and vertical rows (e.g., horizontal rows and vertical columns) with cells at the intersections of the horizontal and vertical rows or columns that may contain information. For instance, a board may include items defining objects or entities that may be managed in a platform, the objects or entities presented in rows and columns defining cells in which data is contained, as described in greater detail below. Maintaining a plurality of boards may refer to storing or otherwise retaining the plurality of boards and/or its underlying data in a repository. For example, the plurality of boards may be kept in an existing or operating state in a repository containing a data structure located locally or remotely. Additionally or alternatively, maintaining the plurality of boards may refer to modifying the plurality of boards to correct faults, to improve performance, functionality, capabilities, or other attributes, to optimize, to delete obsolete capabilities, and/or to change the workflow in any other way once it is already in operation. A plurality of boards related to a common entity may refer to two or more boards which are associated with an account, which may be associated with any entity such as at least one individual or organization. An external address may include an email address, a name, a physical address, a phone number, or any other identifier which may be used to establish communication with an entity. Differing external addresses may be associated with different entities, or differing external addresses may be different external addresses associated with a common entity (e.g., an individual with multiple email accounts in different domains).

As an example, FIG. 17 depicts an exemplary board 1700 including name cells 1702a to 1702c (associated with Damon Massey, Ayisha Burks, and Herbert Swan) and contact cells 1704a to 1704c (associated with damon.massey@comp1.com and a.burks@outlook.com, with empty cell 1704c being blank) which may be capable of containing external addresses. Board 1700 may be related to other boards such as one or more of boards 1802a to 1802d of FIG. 18. For example, board 1700 may be related to boards 1802b and 1802c because they are related to a common entity, in this case "Compl." Similarly, board 1700 may be related to board 1802a because the at least one processor determines that context surrounding "Herbert Swan" relates him to being an employee of "Company 2," and board 1802a is also related to "Company2" because it contains external addresses containing "@comp2.com" for the domain name. As another example, the at least one processor may perform semantic analysis on the plurality of boards 1700 and 1802a to 1802d to determine that boards 1700 and 1802d are related because the external address "a.burks@outlook.com" of board 1700 is in the same format (e.g., same domain name of "@outlook.com" or any other format) as the external addresses of board 1802d.

Some disclosed embodiments may involve receiving an indication of an intent to send a communication, the indication originating from a specific board of the plurality of boards. Receiving an indication may refer to the at least one processor receiving a command or signal through any interface such as a mouse, keyboard, touchscreen, microphone, webcam, softcam, touchpad, trackpad, image scanner, trackball, or any other input device. Receiving an indication of an intent to send a communication may refer to an entity providing an input to a system via any interface to inform or instruct the at least one processor that they wish to transmit a communication (e.g., any information, a file, text message, audio message, or any other communication). The indication may originate from a specific board of the plurality of boards may be the system receiving a command or signal as a result of an interaction with an element of one of the boards of the plurality of boards (e.g., an indication of an intent to send a communication via an input). For example, a user through a network access device may click on a cell of the specific containing an entity identifier to indicate their intent to send a communication to the entity associated with the entity identifier. In some embodiments, receiving an indication of an intent to send the communication may include an activation of a link associated with an item in the specific board. For example, a cell may contain a link that may be activated as a result of selecting the cell. In another example, a cell containing a recipient's name may be selected, which may result in the activation of a link associated with the selected cell (e.g., another cell in the same row) that may contain the recipient's contact address. A link may refer to any destination address which may include an address, hyperlink, inline link, anchor, or any other reference to data that an entity may activate to retrieve such data. Activation of the link may be carried out in response to receiving an indication of an intent to send a communication, as described previously. For example, activation of a link may involve receiving an input of a selection of a cell of a board, where the cell contains a link that is activated upon selection. An activation of a link may refer to clicking on a link (e.g., a single-click, double-click, right-click, or any other type of click) with a mouse, touchpad, touchscreen, joystick, keyboard (e.g., shift+click or a command), or any other way of informing a device that an entity desires to reach an address associated with a link. For example, activating a link may indicate to the at least one processor that an entity wishes to establish communication with another entity associated to the link. An item may refer to one or more users, entities, associated or grouped entity (e.g., a group of users), property addresses, digital files, assets, and/or any object which may be stored digitally. A link may be associated with an item in a board by containing a link in a cell associated with an item (e.g., a cell containing a link in the same row or column as an item). Other information associated with an item may also contain links, such as through an item heading, a graphical indication depicting a person, or any other information that may be contained in cells.

As an illustrative example, a user viewing board 1700 of FIG. 17 may indicate their intent to send a communication by activating an element of board 1700. For instance, the user may click on one of a name or contact to indicate their intent of sending a communication. As another example, the user may click on a link associated with one of the entities of board 1700 board (e.g., one of contact cells 1704*a* to 1704*c* of FIG. 17). The link may be the names contained in name cells 1702*a* to 1702*c* and/or the external addresses contained in contact cells 1704*a* to 1704*c* or may be contained in additional cells of the board (not shown). In other embodiments, clicking on one of a name, contact, or other may cause the at least one processor to present an interface to the user, which may then be used by the user to indicate their intent to send a communication via a different link, button, or other appropriate object to receive an input.

Some disclosed embodiments may involve, in response to receiving the indication, rendering a communication interface associated with the specific board. A communication interface associated with the specific board may refer to a user interface for generating and configuring communications. Rendering a communication interface may include providing the communication interface to the entity by outputting one or more signals configured to result in the presentation of the communication interface on a screen, other surface, through a projection, or in a virtual space. This may occur, for example, on one or more of a touchscreen, monitor, AR or VR display, or any other means as previously discussed and discussed below. A communication interface may be presented, for example, via a display screen associated with a computing device such as a PC, laptop, tablet, projector, cell phone, or personal wearable device. A communication interface may also be presented virtually through AR or VR glasses, or through a holographic display. Other mechanisms of presenting may also be used to enable a user to visually comprehend the presented information. The communication interface may appear as a new window, as a pop-up, or in other manner for presenting the interface on a device. In some embodiments, the at least one processor may be configured to render the communication interface associated with the specific board in a co-presentation with the specific board, which may refer to outputting the communication interface at the same time as the specific board in a display or any other visualization such that both the communication interface and the specific board may be presented simultaneously.

For example, FIG. 19 depicts communication interface 1900. Communication interface 1900 may include a recipient field 1902 (that may be populated by, for example, additional retrieved external addresses 1904*a* to 1904*e*) and message field 1906. The at least one processor may, in response to receiving an indication to send a communication from a user from a board (e.g., clicking on cell 1702*a* of FIG. 17 containing "Damon Massey"), render communication interface 1900 to the user through a screen that my initially populate some information based on the indication to send the communication (e.g., information such as the contact address for "Damon Massey" because the cell 1702*a* of FIG. 17 was selected). Communication interface 1900 may be associated with board 1700 such that communication interface 1900 may be provided to the user when the user interacts with an element of board 1700. Communication interface 1900 may be provided to the user on its own or may be rendered in a co-presentation with board 1700.

Some disclosed embodiments may involve performing a look up of a subset of the plurality of boards linked to the specific board. A subset of the plurality of boards linked to the specific board may include a part or all of the plurality of boards which are associated with the specific board. For example, for a specific board associated with an entity 'X', a subset of the plurality of boards linked to the specific board may include the boards associated with the entity 'X'. Performing a look up of a subset of boards may refer to the at least one processor identifying and accessing the subset of boards which may be linked or otherwise associated with the specific board. In some embodiments, performing the look up of the subset of the plurality of boards linked to the specific board may be based on an activated link in the specific board. For instance, the link activated by an entity wishing to establish communication, as previously described, may provide characteristics (e.g., a name associated with the link, an IP address, a project name, or any other identifiable attribute associated with the link) that the system may use to identify the subset of the plurality of boards. As an example, a cell of a table may contain a name "Damon Massey" which may also be an activatable link to retrieve contact information associated with "Damon Massey." As a result of activating the link, the system may use the attribute of the name "Damon Massey" to perform a look up for this name in other boards that may be associated with the table containing the cell.

By way of example, the at least one processor may perform a look up of a subset of boards 1802*a* to 1802*d* in FIG. 18. The subset may be based on the activated link in the specific board 1700. For instance, if a user activates a link associated with "Damon Massey" in board 1700, the at least one processor may perform a look up of boards 1802*a* to 1802*d* to determine a subset of boards 1802*b* and 1802*c*. This determination may be based on the fact that this subset of boards 1802*b* and 1802*c* include relevant information to the activated link associated with "damon.massey@comp1.com" and because these boards contain information to related to "Damon Massey" and contact addresses with a common domain name "@comp1.com." As another example, if the user activates a link associated with "Ayisha Burks," the at least one processor may perform a look up and determine board 1802*d* to be the subset of the plurality of boards, since this board 1802*d* and "Ayisha Burks" may be associated with "Company3" through metadata not shown in FIG. 18.

Some disclosed embodiments may involve retrieving external addresses from each of the subset of the plurality of boards, which may refer to fetching one or more external addresses from each board of the subset of boards linked to the specific board. For example, for a subset of boards linked to a specific board because they are all related to a same company, e.g., Company 1, the at least one processor may retrieve email addresses found in the boards that have been determined to be a part of the subset of the plurality of boards.

In some embodiments, performing the look up of a subset of the plurality of boards may include performing semantic analysis on at least one cell of the specific board, performing semantic analysis on a plurality of cells of the plurality of boards, and retrieving the external addresses may be based on a connection between the semantic analysis of the specific board and the semantic analysis of the plurality of boards. Semantic analysis may include but is not limited to an analysis of a board, digital file, webpage, or any other form which may store external addresses, which may interrogate and analyze syntactic structures, from the levels of words, phrases, clauses, sentences, and paragraphs to the writing as a whole, in order to derive meaning from words. In particular, semantic analysis may be performed on at least one cell of the specific board and on a plurality of cells of the plurality of boards to identify and retrieve external addresses which may be appropriate for the entity wishing to establish communication. For example, semantic analysis may be performed on the cells in a row clicked on by a person 'A' to establish that person 'A' wishes to establish communication with a real estate broker from Atlanta, Ga. The at least one processor may then perform semantic analysis on a plurality of cells of the plurality of boards to determine whether there are more external addresses for real estate brokers in Atlanta that person 'A' may also wish to send the communication to. In this example, retrieving external addresses from each of the subset of the plurality of boards may be based on the connection between the semantic analysis of the specific board and the semantic analysis of the plurality of boards, namely, real estate brokers in Atlanta.

In some other embodiments, the at least one processor may be further configured to retrieve external addresses from each of the subset of the plurality of boards based on a context including at least one of a column heading, common characteristics between the specific board and at least one board of the subset of the plurality of boards, a common domain, an address, or a name. Retrieving external addresses based on a context may refer to retrieving specific external addresses based on information related to the indication of intent to send a communication. For example, the context may be based on associated information with the activated link, as previously discussed, which may include a column heading, common characteristics between one or more boards, a common domain, an address, and/or a name. For example, external addresses may be retrieved based on a column heading named 'Veterinarians', which may indicate to the at least one processor that a user is attempting to contact a veterinarian, leading it to retrieve external addresses related to veterinarians from other boards of the subset of the plurality of boards. Additionally, in this example the at least one processor may consider the location of the veterinarians (through an address found in the board or an online look up of each veterinarian), the domain of the external address associated with the veterinarian (e.g., to identify other employees of the same clinic), the name of the veterinarian clinic (e.g., also to identify other employees of the same clinic), and any other factor which may be useful when determining which external addresses to retrieve.

Continuing the above example, if a user has activated a link associated with "Damon Massey," and the at least one processor has performed a look up of a plurality of boards and determined a subset of the boards to include boards 1802*b* and 1802*c* of FIG. 18 because of the name "Damon Massey" and because of a shared contact address domain name "@comp1.com." As a result, the at least one processor may retrieve external addresses from boards 1802*b* and 1802*c*. The retrieved external addresses may be associated with the activated link, for example, because of the common name and domain name in the contact address, but may also be retrieved based on other context as discussed above. For example, the at least one processor may perform semantic analysis on one or more cells of board 1700 associated with the activated link and on a plurality of cells of boards 1802*b* and 1802*c* (e.g., the "Name" cells, the "Contact" cells or other cells not shown, such as "Organization," "Location," "Date Added" cells, or any other cells which may provide information on an associated with the entity associated with the activated link). The at least one processor may then retrieve the external addresses based on a connection between the semantic analysis of board 1700 and boards 1802*b* and 1802*c*. For instance, the at least one processor may retrieve external addresses based on identifying the domain "@comp1.com" in cell 1704*a* of board 1700 and in certain "Contact" cells of boards 1802*b* and 1802*c*.

Some disclosed embodiments may involve populating the communication interface with the communication and the retrieved external addresses, which may refer to the at least one processor adding the communication and the retrieved external addresses to previously empty or incomplete sections of the rendered communication interface. For example, the at least one processor may provide the retrieved external addresses to an entity for the entity to consider. As another example, for a communication interface including a recipient field and a message body field, the at least one processor may add the retrieved external addresses directly to the recipient field or allow an entity to select external addresses from a list of external addresses and may add a message to the message body field. In some embodiments, the at least one processor may be further configured to populate the communication interface with retrieved external addresses from a source other than the plurality of boards. For instance, the at least one processor may access a data store, document, webpage, or any other file where external addresses may be stored, any of which may be related or unrelated to the plurality of boards. As an example, the at least one processor may have determined that an entity wishes to communicate with someone at 'Company1' and may retrieve external addresses from a common data store containing external addresses associated with 'Company1' which is not related to any of the plurality of boards. However, the system may be configured to also receive external addresses from a user input (e.g., entered as a custom input or as an input for an external address not retrieved by the system) because, for instance, the input external address is not found in the plurality of boards or because the system may not have retrieved that inputted external address because it was not determined to be a part of the subset of boards for retrieving external addresses.

For example, FIG. 19 depicts retrieved external addresses 1904*a* to 1904*e* which have been populated in the communication interface by the at least one processor. The at least one processor may have also populated message field 1906 with an intended communication from the user which initiated the communication. The at least one processor may automatically populate recipient field 19 with the external address associated with the activated link, as previously discussed. In this example, the at least one processor may have populated recipient field 1902 with external address "damon.massey@comp1.com" associated with the activated link. In other embodiments, the at least one processor may not automatically populate recipient field 19 with the external address associated with the activated link and may provide this external address to the user with the rest of the retrieved external addresses. The at least one processor may also include external addresses from a source other than boards 1802a to 1802d. For example, the at least one processor may retrieve external addresses from a data store which contains addresses with a "comp1.com" domain.

In some embodiments, the user may edit the communication directly by typing into message field 1906. In other embodiments, the user may have input the communication elsewhere and the at least one processor may populate message field 1906 automatically. As another example, the at least one processor may provide an editable sample communication in message field 1906 which may be based on the activated link.

Some disclosed embodiments may involve receiving a selection of at least one of the retrieved external addresses, which may refer to the at least one processor receiving a command or signal indicating an external address of the retrieved external addresses for input into a recipient field as an intended recipient.

For example, a user may click on one or more of retrieved external addresses 1904a to 1904e of FIG. 19 to indicate to the at least one processor that they wish to send the communication to the selected external addresses. For instance, the user may click on retrieved external addresses 1904a and 1904b to add "ty.phillips@comp1.com" and "haroon.potts@comp1.com" to recipient field 1902. Additionally or alternatively, there may be a CC field (not shown), and the user may click on a retrieved external address such as retrieved external address 1904c to add "julia.aguirre@comp1.com" to the CC field. In some embodiments, the user may be able to specify whether they wish to add an external address to recipient field 1902, to the CC field (not shown) or to any other appropriate field. Additionally, a user may be able to edit the recipient field 1902 directly by entering in an external address manually that may not have been retrieved by the system, or may not be contained in any of the boards of the system.

Some disclosed embodiments may involve causing the communication to be transmitted to the at least one selected retrieved external address. Causing the communication to be transmitted may include the system transmitting the configured communication to a destination outside of the system (e.g., to the external address). The communication may be transmitted automatically in response to receiving an input from a user indicating instructions to transmit the communication (e.g., clicking on a "send" button) oy may be transmitted automatically at a specified time (e.g., at a date and time established by a preference or at an established time period after receiving instructions to send the communication).

By way of example, the at least one processor may cause the communication contained in message field 1906 of FIG. 19 to be transmitted to the external addresses selected by a user and contained in recipient field 1902. This may occur automatically, as a result of one or more retrieved external addresses being selected, or by receiving an input which indicates that the user wishes to send the communication, for example, by means of a click to a "Send" button (not shown).

Some disclosed embodiments may involve linking a copy of the transmitted communication to at least the specific board. Linking a copy of the transmitted communication may include the at least one processor copying or generating a duplicate, associating, attaching, or in any other way associating the copy of the transmitted communication to a specific board, such as the specific board where the system received the indication of intent to send the communication, as previously discussed. In some embodiments, the at least one processor may be configured to also link the copy of the transmitted communication to at least one of the subset of the plurality of boards from which the retrieved external address was received. For example, for a communication transmitted by a person 'A' to persons 'X', 'Y', and 'Z', the at least one processor may link a copy of the transmitted communication to the specific board which person 'A' used to initiate the communication and any other board of the subset of the plurality of boards related to persons 'X', 'Y', and 'Z.' As another example, the at least one processor may link a copy of the transmitted communication to the specific board which person 'A' used to initiate the communication and any other board of the subset of the plurality of boards related to person 'A'. In some embodiments, the at least one processor may be further configured to populate the specific board with the retrieved external addresses. Populating a specific board with the retrieved external addresses may include containing the retrieved external addresses in at least one cell of the specific board such that the system does not have to re-retrieve those external addresses in the future. For example, a person 'A' may wish to establish communication with a person 'X' who does not have any contact information on the specific board. However, the at least one processor may find an external address associated with person 'X' on another board, and may populate a contact field of the specific board with the external address for person 'X'. As another example, the at least one processor may populate a field associated with person 'X' with external addresses for any number of related persons in a 'related contacts' field. Alternatively, the at least one processor may only populate the contact field or the 'related contacts' field with external addresses selected by person 'A'.

As an illustrative example, the at least one processor may link a copy of the transmitted communication to board 1700 of FIG. 17. The transmitted communication may include the communication contained in message field 1906 of FIG. 19, the one or more external addresses contained in recipient field 1902, the selected external addresses, retrieved external addresses 1904a to 1904e (e.g., addresses retrieved from boards of FIG. 18), or any combination thereof. Linking a copy of the transmitted communication to board 1700 may include copying the communication into a cell of board 1700, adding a link to the communication to a cell of board 1700, attaching a file containing the communication to board 1700, or any other way of connecting a copy of the communication to board 1700. Additionally or alternatively, the at least one processor may link the copy of the transmitted communication to one or more of boards 1802a to 1802d, which may be based on the activated link or on which boards the at least one processor retrieved external addresses for. For example, for the communication depicted in FIG. 19, the copy of the transmitted communication may be linked to boards 1802b and/or 1802c. As another example, if the at least one processor had only retrieved external addresses from board 1802b and not board 1802c, the at least one processor may link the copy of the transmitted communication to either board 1802b or board 1802c, or to both boards 1802b and board 1802c, since both are still part of the same subset associated with the activated link.

In some embodiments, the at least one processor may also populate one or more cells of board 1700 or an associated board of boards 1802a to 1802d with one or more of the retrieved external addresses or one or more of the selected external addresses. For example, if a user has sent a communication to "Damon Massey," the at least one processor may add retrieved external addresses 1904a to 1904e of FIG. 19 to a "Related Contacts" cell (not shown) of board 1700 of FIG. 17.

Figure 20:
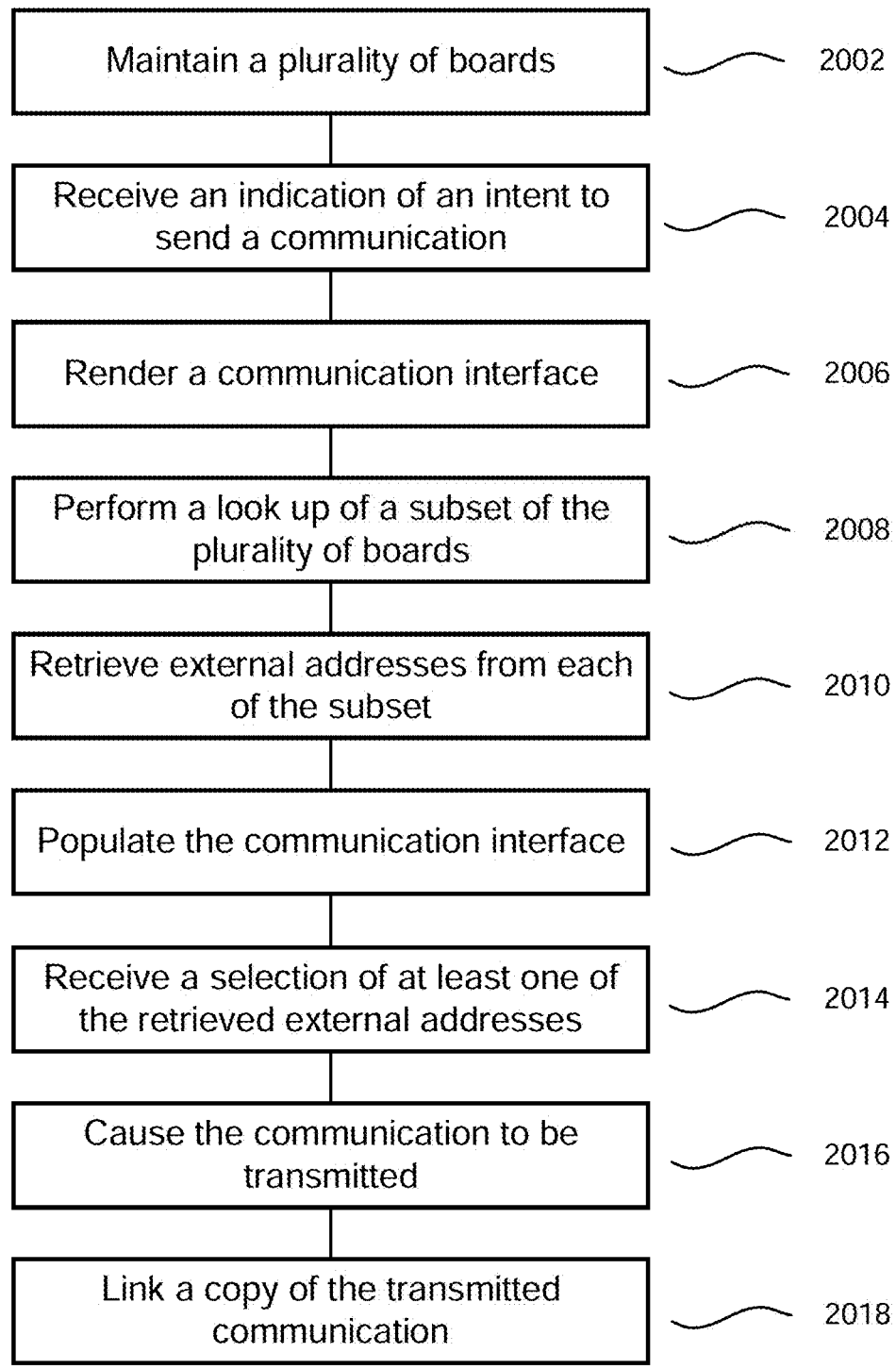
FIG. 20 is a block diagram of an enterprise messaging method for auto-populating recipient fields based on context of source content, consistent with some embodiments of the present disclosure.

FIG. 20 illustrates an exemplary process block diagram of an enterprise messaging method 2000 for auto-populating recipient fields based on context of source content. The method may be implemented, for example, using a system including a processor as previously described. To the extent specific details and examples were already discussed previously, they are not repeated with reference to FIG. 20. In this example, at block 2002 the processor may maintain a plurality of boards related to a common entity, wherein each board of the plurality of boards includes differing external addresses. At block 2004, the processor may receive an indication of an intent to send a communication, the indication originating from a specific board of the plurality of boards. At block 2006, the processor may render a communication interface associated with the specific board in response to receiving the indication. At block 2008, the processor may perform a look up of a subset of the plurality of boards linked to the specific board. At block 2010, the processor may retrieve external addresses from each of the subset of the plurality of boards. At block 2012, the processor may populate the communication interface with the communication and the retrieved external addresses. At block 2014, the processor may receive a selection of at least one of the retrieved external addresses. At block 2016, the processor may cause the communication to be transmitted to the at least one selected retrieved external address. At block 2018, the processor may link a copy of the transmitted communication to at least the specific board.

Unless otherwise defined, all technical and scientific terms used herein have the same meaning as commonly understood by one of ordinary skill in the art. The materials, methods, and examples provided herein are illustrative only and not intended to be limiting.

Implementation of the method and system of the present disclosure may involve performing or completing certain selected tasks or steps manually, automatically, or a combination thereof. Moreover, according to actual instrumentation and equipment of preferred embodiments of the method and system of the present disclosure, several selected steps may be implemented by hardware (HW) or by software (SW) on any operating system of any firmware, or by a combination thereof. For example, as hardware, selected steps of the disclosure could be implemented as a chip or a circuit. As software or algorithm, selected steps of the disclosure could be implemented as a plurality of software instructions being executed by a computer using any suitable operating system. In any case, selected steps of the method and system of the disclosure could be described as being performed by a data processor, such as a computing device for executing a plurality of instructions.

As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

Although the present disclosure is described with regard to a "computing device", a "computer", or "mobile device", it should be noted that optionally any device featuring a data processor and the ability to execute one or more instructions may be described as a computing device, including but not limited to any type of personal computer (PC), a server, a distributed server, a virtual server, a cloud computing platform, a cellular telephone, an IP telephone, a smartphone, a smart watch or a PDA (personal digital assistant). Any two or more of such devices in communication with each other may optionally comprise a "network" or a "computer network".

To provide for interaction with a user, the systems and techniques described here can be implemented on a computer having a display device (a LED (light-emitting diode), or OLED (organic LED), or LCD (liquid crystal display) monitor/screen) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

It should be appreciated that the above described methods and apparatus may be varied in many ways, including omitting or adding steps, changing the order of steps and the type of devices used. It should be appreciated that different features may be combined in different ways. In particular, not all the features shown above in a particular embodiment or implementation are necessary in every embodiment or implementation of the invention. Further combinations of the above features and implementations are also considered to be within the scope of some embodiments or implementations of the invention.

While certain features of the described implementations have been illustrated as described herein, many modifications, substitutions, changes and equivalents will now occur to those skilled in the art. It is, therefore, to be understood that the appended claims are intended to cover all such modifications and changes as fall within the scope of the implementations. It should be understood that they have been presented by way of example only, not limitation, and various changes in form and details may be made. Any portion of the apparatus and/or methods described herein may be combined in any combination, except mutually exclusive combinations. The implementations described herein can include various combinations and/or sub-combinations of the functions, components and/or features of the different implementations described.

Disclosed embodiments may include any one of the following bullet-pointed features alone or in combination with one or more other bullet-pointed features, whether implemented as a method, by at least one processor, and/or stored as executable instructions on non-transitory computer-readable media:

- maintaining at least one table of the workflow management system, the at least one table containing a plurality of items and a plurality of asset designations, each asset designation being associated with at least one of the plurality of items;
- maintaining at least one electronic whiteboard containing at least a subset of the plurality of asset designations;
- maintaining a data structure containing a plurality of links;
- wherein each link associates at least one of the subsets of asset designations with at least one location on the at least one electronic whiteboard;
- receiving via a network access device having a display presenting the at least one table, an activation of a particular link associated with a particular asset;
- in response to the activation of the particular link, altering the display to present at least a particular location on the at least one electronic whiteboard containing a particular asset designation corresponding to the particular asset;
- wherein the particular location includes a cluster of additional asset designations related to the particular asset;
- receiving a selection of at least one of the additional asset designations or the particular asset designation;
- in response to the selection, retrieving a corresponding asset;
- causing the corresponding asset to be presented on the display;
- wherein the particular asset is a digital file, including at least one of a text, video, audio, image, design, document, tabular, an image file, a video file, a drawing file, a graphic file, a presentation file, project management file, or a web page;
- wherein the cluster of additional asset designations is based on at least one of an author, owner, project, item, subject matter, team, file type, deadline, status, metadata, label, budget, or data source;
- wherein at least one of the additional asset designations of the cluster is associated with a differing asset from the particular asset;
- wherein at least one of the additional asset designations of the cluster is activatable to access information of another table;
- receiving an alteration to the presented corresponding asset;
- wherein the alteration causes sending a notification to an entity associated with the presented corresponding asset;
- receiving an alteration to the presented corresponding asset;
- wherein the alteration to the presented corresponding asset causes the presented corresponding asset to be associated with another cluster of the electronic whiteboard;
- receiving an alteration to the presented corresponding asset;
- wherein the alteration to the presented corresponding asset causes a simultaneous change to the at least one table and the at least one electronic whiteboard;
- maintaining a plurality of interconnected boards;
- wherein a first group of at least some of the plurality of interconnected boards include items that contain external contact addresses;
- wherein a second group of at least some of the plurality of interconnected boards omit external contact addresses;
- monitoring, via a mediator overlay on the enterprise messaging system, contact addresses of incoming messages;
- comparing a contact address of an incoming message against a repository of addresses associated with the first group of at least some of the plurality of interconnected boards;
- in response to a match between the contact address of the incoming message and at least one address contained in the repository, generating at least one primary duplicate of the incoming message;
- associating the at least one primary duplicate of the incoming message with each board of the first group of at least some of the plurality of interconnected boards;
- determining for each of the boards of the first group having the at least one primary duplicate message associated therewith at least one linked board of the second group;
- generating for the at least one linked board of the second group at least one secondary duplicate of the incoming message;
- associating the at least one secondary duplicate of the incoming message with the at least one linked board of the second group;
- determining for each of the boards of the second group having the at least one secondary duplicate message associated therewith at least one linked board of a third group of at least some of the plurality of interconnected boards;
- generating for the at least one linked board of the third group at least one tertiary duplicate of the incoming message;
- associating the at least one tertiary duplicate of the incoming message with the at least one linked board of the third group;
- determining for each of the boards of the third group having the at least one tertiary duplicate message associated therewith at least one linked board of a fourth group of at least some of the plurality of interconnected boards;
- generating for the at least one linked board of the fourth group at least one quaternary duplicate of the incoming message;

associating the at least one quaternary duplicate of the incoming message with the at least one linked board of the fourth group;

monitoring, via the mediator overlay, contact addresses of outgoing messages;

comparing a contact address of an outgoing message against the repository of addresses associated with the first group of at least some of the plurality of interconnected boards;

in response to a match between the contact address of the outgoing message and at least one address contained in the repository, generating at least one primary duplicate message of the specific outgoing message;

associating the at least one primary duplicate message of the specific outgoing message with each board of the first group of at least some of the plurality of interconnected boards;

determining for each of the boards of the first group having the at least one primary duplicate message of the specific outgoing message associated therewith at least one linked board of the second group;

generating for the at least one linked board of the second group at least one secondary duplicate message of the specific outgoing message;

associating the at least one secondary duplicate message of the specific outgoing message with the at least one linked board of the second group;

aggregating associated messages of at least one board of the first group in chronological order;

in response to an input, rendering a presentation of the aggregated associated messages;

filtering the aggregated associated messages by an aspect including at least one of an author, recipient, board owner, date, communication type, communication content, or board address;

adding a quote to the aggregated associated messages in chronological order;

maintaining a plurality of boards related to a common entity;

wherein each board of the plurality of boards includes differing external addresses;

receiving an indication of an intent to send a communication, the indication originating from a specific board of the plurality of boards;

in response to receiving the indication, rendering a communication interface associated with the specific board;

performing a look up of a subset of the plurality of boards linked to the specific board;

retrieving external addresses from each of the subset of the plurality of boards;

populating the communication interface with the communication and the retrieved external addresses;

receiving a selection of at least one of the retrieved external addresses;

causing the communication to be transmitted to the at least one selected retrieved external address;

linking a copy of the transmitted communication to at least the specific board.

linking the copy of the transmitted communication to at least one of the subset of the plurality of boards from which the retrieved external address was retrieved;

populating the communication interface with retrieved external addresses from a source other than the plurality of boards;

wherein performing the look up of a subset of the plurality of boards includes performing semantic analysis on at least one cell of the specific board, performing semantic analysis on a plurality of cells of the plurality of boards;

wherein retrieving the external addresses is based on a connection between the semantic analysis of the specific board and the semantic analysis of the plurality of boards;

retrieving external addresses from each of the subset of the plurality of boards based on a context including at least one of a column heading, common characteristics between the specific board and at least one board of the subset of the plurality of boards, a common domain, an address, or a name;

wherein receiving an indication of an intent to send the communication includes an activation of a link associated with an item in the specific board;

wherein performing the look up of the subset of the plurality of boards linked to the specific board is based on the activated link in the specific board;

rendering the communication interface associated with the specific board in a co-presentation with the specific board; and populating the specific board with the retrieved external addresses.

Systems and methods disclosed herein involve unconventional improvements over conventional approaches. Descriptions of the disclosed embodiments are not exhaustive and are not limited to the precise forms or embodiments disclosed. Modifications and adaptations of the embodiments will be apparent from consideration of the specification and practice of the disclosed embodiments. Additionally, the disclosed embodiments are not limited to the examples discussed herein.

The foregoing description has been presented for purposes of illustration. It is not exhaustive and is not limited to the precise forms or embodiments disclosed. Modifications and adaptations of the embodiments will be apparent from consideration of the specification and practice of the disclosed embodiments. For example, the described implementations include hardware and software, but systems and methods consistent with the present disclosure may be implemented as hardware alone.

It is appreciated that the above described embodiments can be implemented by hardware, or software (program codes), or a combination of hardware and software. If implemented by software, it can be stored in the above-described computer-readable media. The software, when executed by the processor can perform the disclosed methods. The computing units and other functional units described in the present disclosure can be implemented by hardware, or software, or a combination of hardware and software. One of ordinary skill in the art will also understand that multiple ones of the above described modules/units can be combined as one module or unit, and each of the above described modules/units can be further divided into a plurality of sub-modules or sub-units.

The block diagrams in the figures illustrate the architecture, functionality, and operation of possible implementations of systems, methods, and computer hardware or software products according to various example embodiments of the present disclosure. In this regard, each block in a flowchart or block diagram may represent a module, segment, or portion of code, which includes one or more executable instructions for implementing the specified logical functions. It should be understood that in some alternative implementations, functions indicated in a block may occur out of order noted in the figures. For example, two blocks shown in succession may be executed or implemented substantially concurrently, or two blocks may sometimes be executed in reverse order, depending upon the functionality involved. Some blocks may also be omitted. It should also be understood that each block of the block diagrams, and combination of the blocks, may be implemented by special purpose hardware-based systems that perform the specified functions or acts, or by combinations of special purpose hardware and computer instructions.

In the foregoing specification, embodiments have been described with reference to numerous specific details that can vary from implementation to implementation. Certain adaptations and modifications of the described embodiments can be made. Other embodiments can be apparent to those skilled in the art from consideration of the specification and practice of the invention disclosed herein. It is intended that the specification and examples be considered as example only, with a true scope and spirit of the invention being indicated by the following claims. It is also intended that the sequence of steps shown in figures are only for illustrative purposes and are not intended to be limited to any particular sequence of steps. As such, those skilled in the art can appreciate that these steps can be performed in a different order while implementing the same method.

It will be appreciated that the embodiments of the present disclosure are not limited to the exact construction that has been described above and illustrated in the accompanying drawings, and that various modifications and changes may be made without departing from the scope thereof.

Other embodiments will be apparent to those skilled in the art from consideration of the specification and practice of the disclosed embodiments disclosed herein. It is intended that the specification and examples be considered as exemplary only, with a true scope and spirit of the disclosed embodiments being indicated by the following claims.

Computer programs based on the written description and methods of this specification are within the skill of a software developer. The various programs or program modules can be created using a variety of programming techniques. One or more of such software sections or modules can be integrated into a computer system, non-transitory computer readable media, or existing software.

Moreover, while illustrative embodiments have been described herein, the scope includes any and all embodiments having equivalent elements, modifications, omissions, combinations (e.g., of aspects across various embodiments), adaptations or alterations based on the present disclosure. The elements in the claims are to be interpreted broadly based on the language employed in the claims and not limited to examples described in the present specification or during the prosecution of the application. These examples are to be construed as non-exclusive. Further, the steps of the disclosed methods can be modified in any manner, including by reordering steps or inserting or deleting steps. It is intended, therefore, that the specification and examples be considered as exemplary only, with a true scope and spirit being indicated by the following claims and their full scope of equivalents.

What is claimed is:

1. An enterprise messaging system for auto-populating recipient fields based on context of source content, the enterprise messaging system comprising:
   at least one processor configured to:
      maintain a plurality of boards related to a common entity, wherein each board of the plurality of boards includes differing external addresses;
      receive an indication of an intent to send a communication, the indication originating from a specific board of the plurality of boards;
      in response to receiving the indication, render a communication interface associated with the specific board;
      perform a look up of a subset of the plurality of boards linked to the specific board;
      retrieve external addresses from each of the subset of the plurality of boards;
      populate the communication interface with the communication and the retrieved external addresses;
      receive a selection of at least one of the retrieved external addresses;
      cause the communication to be transmitted to the at least one selected retrieved external address; and
      link a copy of the transmitted communication to at least the specific board.

2. The system of claim 1, wherein the at least one processor is configured to also link the copy of the transmitted communication to at least one of the subset of the plurality of boards from which the retrieved external address was retrieved.

3. The system of claim 1, wherein the at least one processor is further configured to populate the communication interface with retrieved external addresses from a source other than the plurality of boards.

4. The system of claim 1, wherein performing the look up of a subset of the plurality of boards includes performing semantic analysis on at least one cell of the specific board, performing semantic analysis on a plurality of cells of the plurality of boards, and wherein retrieving the external addresses is based on a connection between the semantic analysis of the specific board and the semantic analysis of the plurality of boards.

5. The system of claim 1, wherein the at least one processor is further configured to retrieve external addresses from each of the subset of the plurality of boards based on a context including at least one of a column heading, common characteristics between the specific board and at least one board of the subset of the plurality of boards, a common domain, an address, or a name.

6. The system of claim 1, wherein receiving an indication of an intent to send the communication includes an activation of a link associated with an item in the specific board.

7. The system of claim 6, wherein performing the look up of the subset of the plurality of boards linked to the specific board is based on the activated link in the specific board.

8. The system of claim 1, wherein the at least one processor is further configured to render the communication interface associated with the specific board in a co-presentation with the specific board.

9. The system of claim 1, wherein the at least one processor is further configured to populate the specific board with the retrieved external addresses.

10. A non-transitory computer readable medium containing instructions that when executed by at least one processor, cause the at least one processor to perform operations for auto-populating recipient fields based on context of source content, the operations comprising:
   maintaining a plurality of boards related to a common entity, wherein each board of the plurality of boards includes differing external addresses;
   receiving an indication of an intent to send a communication, the indication originating from a specific board of the plurality of boards;

in response to receiving the indication, rendering a communication interface associated with the specific board;

performing a look up of a subset of the plurality of boards linked to the specific board;

retrieving external addresses from each of the subset of the plurality of boards;

populating the communication interface with the communication and the retrieved external addresses;

receiving a selection of at least one of the retrieved external addresses;

causing the communication to be transmitted to the at least one selected retrieved external address; and linking a copy of the transmitted communication to at least the specific board.

11. The non-transitory computer readable medium of claim 10, wherein the operations further comprise linking the copy of the transmitted communication to at least one of the subset of the plurality of boards from which the retrieved external address was retrieved.

12. The non-transitory computer readable medium of claim 10, wherein the operations further comprise populating the communication interface with retrieved external addresses from a source other than the plurality of boards.

13. The non-transitory computer readable medium of claim 10, wherein performing the look up of a subset of the plurality of boards includes performing semantic analysis on at least one cell of the specific board, performing semantic analysis on a plurality of cells of the plurality of boards, and wherein retrieving the external addresses is based on a connection between the semantic analysis of the specific board and the semantic analysis of the plurality of boards.

14. The non-transitory computer readable medium of claim 10, wherein the operations further comprise retrieving external addresses from each of the subset of the plurality of boards based on a context including at least one of a column heading, common characteristics between the specific board and at least one board of the subset of the plurality of boards, a common domain, an address, or a name.

15. The non-transitory computer readable medium of claim 10, wherein receiving an indication of an intent to send the communication includes an activation of a link associated with an item in the specific board.

16. The non-transitory computer readable medium of claim 15, wherein performing the look up of the subset of the plurality of boards linked to the specific board is based on the activated link in the specific board.

17. The non-transitory computer readable medium of claim 10, wherein the operations further comprise rendering the communication interface associated with the specific board in a co-presentation with the specific board.

18. The non-transitory computer readable medium of claim 10, wherein the operations further comprise populating the specific board with the retrieved external addresses.

19. A method for auto-populating recipient fields based on context of source content, the method comprising:

maintaining a plurality of boards related to a common entity, wherein each board of the plurality of boards includes differing external addresses;

receiving an indication of an intent to send a communication, the indication originating from a specific board of the plurality of boards;

in response to receiving the indication, rendering a communication interface associated with the specific board;

performing a look up of a subset of the plurality of boards linked to the specific board;

retrieving external addresses from each of the subset of the plurality of boards;

populating the communication interface with the communication and the retrieved external addresses;

receiving a selection of at least one of the retrieved external addresses;

causing the communication to be transmitted to the at least one selected retrieved external address; and linking a copy of the transmitted communication to at least the specific board.

20. The method of claim 19, the method further comprising retrieving external addresses from each of the subset of the plurality of boards based on a context including at least one of a column heading, common characteristics between the specific board and at least one board of the subset of the plurality of boards, a common domain, an address, or a name.

* * * * *